US010049155B2

(12) United States Patent
Neela et al.

(10) Patent No.: US 10,049,155 B2
(45) Date of Patent: Aug. 14, 2018

(54) SYSTEM FOR MENDING THROUGH AUTOMATED PROCESSES

(71) Applicant: Bank of America Corporation, Charlotte, NC (US)

(72) Inventors: Raghuram Neela, Charlotte, NC (US); Seyamak Amin, Plano, TX (US); David Joa, San Bruno, CA (US); Samir B. Pawar, Charlotte, NC (US); Krishna Reddy Mandala, Telangana (IN); Santosh Siva Kumar Maddila, Telangana (IN); Santosh Kumar Maradla, Andhra Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/001,918

(22) Filed: Jan. 20, 2016

(65) Prior Publication Data
US 2017/0206272 A1 Jul. 20, 2017

(51) Int. Cl.
*G06F 17/27* (2006.01)
*G06F 17/30* (2006.01)
(Continued)

(52) U.S. Cl.
CPC ........ *G06F 17/30707* (2013.01); *G06F 17/24* (2013.01); *G06F 17/28* (2013.01);
(Continued)

(58) Field of Classification Search
None
See application file for complete search history.

(56) References Cited

U.S. PATENT DOCUMENTS 5,864,483 A 1/1999 Brichta
RE38,801 E 9/2005 Rogers
(Continued)

OTHER PUBLICATIONS

Chemical Unveils Basic Bank Account; NY Campaign Targets Blacks, Hispanics; Shoultz, Donald. American Banker (pre-1997 Fulltext) [New York, N.Y] Nov. 24, 1987:2.
(Continued)

*Primary Examiner* — Kevin Ky
(74) *Attorney, Agent, or Firm* — Michael A. Springs; Moore & Van Allen PLLC; Patrick B. Horne

(57) ABSTRACT

Systems and methods are provided for transforming historical data collected in response to one or more triggering events, in order to classify textual values. Embodiments access a plurality of textual values from historical transaction data; identify one or more distinct patterns within the plurality of textual values; group the textual values based on the one or more distinct patterns, thereby forming one or more clusters; apply a similarity gauge to the textual values of each of the clusters to determine similarity or dissimilarity among the textual values of each cluster; and filter the textual values of each cluster to determine which textual values belong in each cluster, wherein the textual values that belong are cluster values. Some embodiments also remove undesired characters from the textual values, and in some cases identifying the distinct patterns includes comparing pronunciations and/or phonetics of the textual values.

15 Claims, 33 Drawing Sheets

(51) Int. Cl.
*G06F 17/24* (2006.01)
*G06F 17/28* (2006.01)
(52) U.S. Cl.
CPC .. *G06F 17/30681* (2013.01); *G06F 17/30684* (2013.01); *G06F 17/30702* (2013.01)

(56) References Cited

U.S. PATENT DOCUMENTS

| | | |
|---|---|---|
| 7,472,090 B1 | 12/2008 | White |
| 7,657,474 B1 | 2/2010 | Dybala et al. |
| 7,792,727 B2 | 9/2010 | Ghosh et al. |
| 8,078,529 B1 | 12/2011 | Carrier et al. |
| 8,225,268 B2 | 7/2012 | Nakano |
| 8,229,784 B2 | 7/2012 | Kala et al. |
| 8,260,725 B2 | 9/2012 | Crawford |
| 8,380,621 B1 | 2/2013 | Bent et al. |
| 8,566,197 B2 | 10/2013 | Satyavolu et al. |
| 8,583,550 B1 | 11/2013 | Yeri et al. |
| 8,688,572 B2 | 4/2014 | Shao et al. |
| 8,805,730 B2 | 8/2014 | Yeri et al. |
| 8,874,674 B2 | 10/2014 | Allison et al. |
| 9,280,747 B1* | 3/2016 | Jin .................... G06N 7/005 |
| 2002/0099649 A1 | 7/2002 | Lee et al. |
| 2004/0024617 A1 | 2/2004 | Fralic |
| 2004/0039686 A1 | 2/2004 | Klebanoff |
| 2004/0088243 A1 | 5/2004 | McCoy et al. |
| 2004/0177035 A1 | 9/2004 | Silva |
| 2004/0177053 A1 | 9/2004 | Donoho et al. |
| 2005/0021456 A1 | 1/2005 | Steele et al. |
| 2005/0032027 A1* | 2/2005 | Patton .................... G09B 17/00 434/170 |
| 2005/0086166 A1 | 4/2005 | Monk et al. |
| 2006/0047593 A1 | 3/2006 | Naratil et al. |
| 2006/0129896 A1 | 6/2006 | Rohn |
| 2006/0271997 A1 | 11/2006 | Jacoby et al. |
| 2006/0276180 A1 | 12/2006 | Henry, Jr. |
| 2007/0021991 A1 | 1/2007 | Etzioni et al. |
| 2007/0055594 A1 | 3/2007 | Rivest et al. |
| 2007/0078719 A1 | 4/2007 | Schmitt et al. |
| 2007/0078869 A1 | 4/2007 | Can et al. |
| 2007/0094259 A1 | 4/2007 | Shi |
| 2007/0106558 A1 | 5/2007 | Mitchell et al. |
| 2008/0046334 A1 | 2/2008 | Lee et al. |
| 2008/0140506 A1 | 6/2008 | Christianson et al. |
| 2008/0147464 A1 | 6/2008 | Sauter et al. |
| 2008/0177650 A1 | 7/2008 | Jung et al. |
| 2008/0177726 A1 | 7/2008 | Forbes et al. |
| 2008/0189169 A1 | 8/2008 | Turpin et al. |
| 2009/0024496 A1 | 1/2009 | Balachandran et al. |
| 2009/0132347 A1 | 5/2009 | Anderson et al. |
| 2009/0164351 A1 | 6/2009 | Sorbe et al. |
| 2009/0164400 A1 | 6/2009 | Amer-Yahia et al. |
| 2009/0164897 A1 | 6/2009 | Amer-Yahia et al. |
| 2009/0222325 A1 | 9/2009 | Anderson et al. |
| 2009/0234715 A1 | 9/2009 | Heiser, II et al. |
| 2009/0271287 A1 | 10/2009 | Halpern |
| 2009/0276289 A1 | 11/2009 | Dickinson et al. |
| 2009/0287536 A1 | 11/2009 | Sheng |
| 2009/0287687 A1 | 11/2009 | Martire et al. |
| 2009/0292632 A1 | 11/2009 | Dheer et al. |
| 2009/0319438 A1 | 12/2009 | Jain |
| 2009/0327308 A1 | 12/2009 | Carter et al. |
| 2010/0100424 A1 | 4/2010 | Buchanan et al. |
| 2010/0106577 A1 | 4/2010 | Grimes |
| 2010/0145857 A1 | 6/2010 | Davila et al. |
| 2010/0161379 A1 | 6/2010 | Bene et al. |
| 2010/0217706 A1 | 8/2010 | Griffin et al. |
| 2010/0223264 A1 | 9/2010 | Bruckner et al. |
| 2010/0280892 A1 | 11/2010 | Uzunalioglu et al. |
| 2010/0280927 A1 | 11/2010 | Faith et al. |
| 2011/0054981 A1 | 3/2011 | Faith et al. |
| 2011/0125565 A1 | 5/2011 | MacIlwaine et al. |
| 2011/0125643 A1 | 5/2011 | Cameo et al. |
| 2011/0166994 A1 | 7/2011 | Ross et al. |
| 2011/0231305 A1 | 9/2011 | Winters |
| 2011/0238550 A1 | 9/2011 | Reich et al. |
| 2011/0246278 A1 | 10/2011 | Kubo |
| 2011/0246907 A1 | 10/2011 | Wang et al. |
| 2011/0251917 A1 | 10/2011 | Etzioni et al. |
| 2011/0295902 A1* | 12/2011 | Mande ................. G06F 19/14 707/794 |
| 2011/0302079 A1 | 12/2011 | Neuhaus |
| 2011/0313835 A1 | 12/2011 | Falkenborg et al. |
| 2011/0313900 A1 | 12/2011 | Falkenborg et al. |
| 2011/0320250 A1 | 12/2011 | Gemmell et al. |
| 2012/0059702 A1 | 3/2012 | Yoder et al. |
| 2012/0066064 A1 | 3/2012 | Yoder et al. |
| 2012/0078766 A1 | 3/2012 | Rose et al. |
| 2012/0101881 A1 | 4/2012 | Taylor et al. |
| 2012/0179633 A1* | 7/2012 | Ghani .............. G06F 17/30705 706/12 |
| 2012/0191776 A1 | 7/2012 | Ruffner et al. |
| 2012/0215597 A1 | 8/2012 | Ross |
| 2012/0215610 A1 | 8/2012 | Amaro et al. |
| 2012/0221505 A1 | 8/2012 | Evans et al. |
| 2012/0239437 A1 | 9/2012 | Harris et al. |
| 2012/0239466 A1 | 9/2012 | Hu et al. |
| 2012/0253918 A1 | 10/2012 | Marois et al. |
| 2012/0271691 A1 | 10/2012 | Hammad et al. |
| 2013/0018982 A1 | 1/2013 | McConnell et al. |
| 2013/0030973 A1 | 1/2013 | Ohkubo et al. |
| 2013/0054334 A1 | 2/2013 | Ross et al. |
| 2013/0060669 A1 | 3/2013 | Rose et al. |
| 2013/0073386 A1 | 3/2013 | Rose et al. |
| 2013/0090998 A1 | 4/2013 | Shimogori |
| 2013/0212455 A1 | 8/2013 | Titera et al. |
| 2013/0325574 A1 | 12/2013 | Joa et al. |
| 2013/0325598 A1 | 12/2013 | Shao et al. |
| 2013/0325599 A1 | 12/2013 | Yeri et al. |
| 2013/0325604 A1 | 12/2013 | Yeri et al. |
| 2013/0325674 A1 | 12/2013 | Yeri et al. |
| 2013/0325679 A1 | 12/2013 | Yeri et al. |
| 2013/0325697 A1 | 12/2013 | Allison, Jr. et al. |
| 2013/0325698 A1 | 12/2013 | Shao et al. |
| 2013/0325699 A1 | 12/2013 | Yeri et al. |
| 2013/0325707 A1 | 12/2013 | Joa et al. |
| 2013/0325713 A1 | 12/2013 | Yeri et al. |
| 2013/0325716 A1 | 12/2013 | Yeri et al. |
| 2013/0325946 A1 | 12/2013 | Allison, Jr. et al. |
| 2014/0365196 A1* | 12/2014 | Melander ............ G06F 17/5009 703/13 |
| 2016/0041895 A1* | 2/2016 | Galvin ................ G06F 11/3644 717/130 |
| 2016/0041985 A1 | 2/2016 | Manterach et al. |

OTHER PUBLICATIONS

Credit scoring with uncertain class definitions; Kelly etl.; Oct. 1999; ISSN: 0953-0061.
Ferris, Tom, "Banks warned in wake of Huton mess." American Banker, SourceMedia Inc. 1985. HighBeam Research. Apr. 14, 2013 http://www.highbeam.com/.
Community Trend Outlier Detection using Soft Temporal Pattern Mining, Manish Gupta et al, 2001 (Trend Outlier Detection).
Abnormal Pattern Recognition in Spatial Data, Kou, 2006 (Abnormal Pattern Recognition).
Behavioral Fraud Mitigation through Trend Offsets, Feb. 2008 (Fraud Mitigation ).
Regulation D; Reserve Requirements; by Consumer Compliance Handbook; 4 pages; Nov. 2011.
"ACH/Money Transfer Page" by www.trackdatasecurities.com/; May 15, 2009; 12 pages.
PayPal Merchant Tools: A Guide for Using Paypal in your Business; Paypal; 24 pages; by PayPal; Oct. 2, 2003.

* cited by examiner

| TRIGGER TABLE 1 | | |
|---|---|---|
| Trigger | Objective | Description |
| Deposit Reduction 1 (DR1) | User Retention | Decrease in monthly deposits in the last 3 months. Identifies patterns for the beginning of the current month and end of the previous month incoming deposits. Runs on 8th calendar day of every month. |
| Deposit Reduction 2 (DR2) | User Retention | Decrease in monthly deposits in the last 3 months. Identifies end of the current month incoming deposits. Runs on 22nd calendar day of every month |
| Deposit reduction for all users (DRA) | User Retention | Decrease in monthly deposits in the last 3 months |
| Deposit reduction for credit card users only (DRT) | User Retention | Decrease in monthly deposits in the last 3 months |
| Monthly maintenance cost (MTH) | User Retention | Monthly maintenance costs incurred on checking and savings accounts |
| First time monthly maintenance cost-daily (FMD) | User Retention | First time monthly maintenance cost in last six months through MTH category for outbound cost transactions. Refreshed daily to provide a more timely indicator that the event has occurred when compared to FMT |
| First time monthly maintenance cost- weekly (FMT) | User Retention | First time monthly maintenance cost in last six months through MTH category for outbound cost transactions. |
| Outgoing ACH drop (OAD) | User Retention | Current month count (#) </= 50% of avg. # of transactions in the previous 3 months (stability period), where a month is defined as a 4 week rolling period; Avg. # of transactions in the stability period >/= 3. OA1/((OA2+OA3+OA4)/3) is between 0 and 0.5 |
| Outgoing ACH stop (OAS) | User Retention | Current month outgoing ACH transaction count = 0. Avg. # of outgoing ACH transactions in the previous 3 months (stability period) >/= 3, where month is defined as a 4 week rolling period. OA1/((OA2+OA3+OA4)/3)= 0 |
| Outgoing ACH transaction counts for current month (monitoring period) (OA1) | User Retention | Provides outgoing ACH transaction counts for the current month (Monitoring Period). |

*FIG. 7A*

| TRIGGER TABLE 1-CONTINUED | | |
|---|---|---|
| Trigger | Objective | Description |
| Outgoing ACH transaction counts for month 1 of the 3 month stability period (OA2) | User Retention | Provides outgoing ACH transaction counts for the first month of the 3 month Stability Period. |
| Outgoing ACH transaction counts for month 2 of the 3 month stability period (OA3) | User Retention | Provides outgoing ACH transaction counts for the second month of the 3 month Stability Period. |
| Outgoing ACH transaction counts for month 3 of the 3 month stability period (OA4) | User Retention | Provides outgoing ACH transaction counts for the third month of the 3 month Stability Period. |
| Payment and purchase reduction (PPR) | User Retention | Outgoing payment transactions from financial institution's checking, saving, and credit card accounts that meet the following criteria: 1) Current month # of payments minus prior 3 month avg. # of payments >/= 10 2) Current month total payment amount minus prior 3 month avg. total payment amount >/= $1,500 3) Current month total payment amount divided by the prior 3 month avg. total payment amounts </= 50% |
| Current month payment/ purchase (PP1) | User Retention | Current month transaction amount and transaction count for payments |
| Previous 3 month avg. payment/purchase (PP3) | User Retention | Previous 3 month average transaction amount and average transaction count for payments |
| Payment reduction trigger (PRT) | User Retention | Decrease in payments in last 2 months in key necessity categories (e.g., auto loans, mortgage, utilities) |

*FIG. 7B*

| TRIGGER TABLE 2 | | |
|---|---|---|
| Trigger | Objective | Description |
| No ACH deposit but either ATM or Teller deposits (ATT) | User Deepening | No ACH deposit, but ATM or teller deposits in the last two months |
| Monthly deposit increase for engaged users (IGT) | User Deepening | Incoming amount greater than $50 with increase in pattern/behavior of 20% or greater in the current month versus previous month |

*FIG. 7C*

| TRIGGER TABLE 2-CONTINUED | | |
|---|---|---|
| Trigger | Objective | Description |
| No ATM withdrawals in the second last month but ATM withdrawals in the last month (AWL) | User Deepening | No ATM withdrawals in the second last month but had ATM withdrawals in the last month |
| Inbound internal transfer in the last month (IXF) | User Deepening | No inbound internal transfer in the third previous and second previous month, but had inbound internal transfer in the last month |
| ATM deposits (NAD) | User Deepening | No ATM deposits in the second last month but had ATM deposits in the last month |
| Outbound internal transfer in the last month (OXF) | User Deepening | No outbound internal transfer in the third previous and second previous month, but had outbound internal transfer in the last month |
| Direct deposit pay (DDP) | User Deepening | Direct deposit inbound transactions during a time period |

*FIG. 7D*

| TRIGGER TABLE 3 | | |
|---|---|---|
| Trigger | Objective | Description |
| Merchant purchases (AIU) | Account review | Purchases made from specific merchants in a time period |
| First time competitor credit card payment (FOC) | Account review | First competitor credit card payment in the last six months |
| Large withdrawal (LWD) | Account review | Large transaction deposits for which, the transaction amount > $2,500; transaction amount > 2.5 * Average of previous six months; account tenure > 90 days |
| Large withdrawal avg. (LWA) | Account review | Average withdrawal amount for the rolling six month period that is leveraged in the LWD trigger |
| New payment trigger (NPT) | Account review | No inbound payroll transactions for two months in a row, received pay during current and previous month |
| Student loan (STL) | Account review | Payments on a student loan |

*FIG. 7E*

| TRIGGER TABLE 3-Continued | | |
|---|---|---|
| Trigger | Objective | Description |
| Micro ACH transfer (VFY) | Account review | Identifies users who have opened new online savings accounts with third parties by detecting off-us relationships as early as possible. This leverages the signals presented through micro transfers (i.e., < $1) that are often credited to checking or savings accounts before substantial amounts are transferred to the off-us accounts |
| Job change (JCL) | Account review | Transactions that include at least 3 ACH direct deposits from the same employer during a 4 month period (stability period). JCL triggered if pay frequency, i.e., maximum number of days between the 3 most recent ACH deposits + "pad," passes without another ACH direct deposit by a particular employer. Pad is defined as:<br>If max # of days </= 7, then +2 days "pad"<br>if max # of days is 8-18, then +3 days "pad"<br>if max # of days is 16-32, then +5 days "pad" |

FIG. 7F

| TRIGGER TABLE 4 | | |
|---|---|---|
| Trigger | Objective | Description |
| Competitor Brokerage Outflow (CBO) | Product Sales | Third party competitor brokerage payments of at least $1,000 for a single month (30 day rolling) OR at least $500 per month over a three month period. |
| Competitor Brokerage Outflow total for the first of the three month rolling period (CB1) | Product Sales | Provides the cumulative total for the first month (1-30 days) of the the three month period. |
| Competitor Brokerage Outflow total for the second of the three month rolling period (CB2) | Product Sales | Provides the cumulative total for the second month (31-60 days) of the the three month period. |

FIG. 7G

| TRIGGER TABLE 4-Continued | | |
|---|---|---|
| Trigger | Objective | Description |
| Competitor Brokerage Outflow total for the third of the three month rolling period (CB3) | Product Sales | Provides the cumulative total for the third month (61-90 days) of the the three month period. |
| College preparation (SAT) | Product Sales | Payments for college preparation or courses or tutoring for such preparation |
| Other education (EDU) | Product Sales | Payments to an education entity and not a student loan and not a college preparation payment |
| Online shopper (OLS) | Product Sales | Online payments during a time period |
| Off us credit card (OUC) | Product Sales | Payments toward a credit card debt, the credit card being associated with a third party institution |
| Telecom payment (TEL) | Product Sales | Payments to a telecom company |
| Wireless service (WIR) | Product Sales | Payments to a wireless company |
| Large deposits (LDS) | Product Sales | Large transaction deposits for which, the transaction amount > $2,500; transaction amount > 2.5 * Average of previous six months; account tenure > 90 days |
| Payment Increase (PIT) | Product Sales | Increase in pay by 10% or more during current and previous month, compared over 2 month period |
| Bonus Recurrence | Product Sales | Identifies sub-set of large deposits as bonuses well before the event actually happens. This trigger is refreshed on a yearly basis. Trigger is based on: 1) Stability: direct paycheck deposits received at least 10 months in a year; 2) identify a single paycheck with an amount at least twice as much as the median value of all paychecks in a year and that amount is at least $2,500 (this is identified as bonus); 3) focus is on "bonus season," i.e., December, January, February, and March; and 4) In recent two years the "bonus" paycheck is received around the same time each year |

*FIG. 7H*

| TRIGGER TABLE 4-CONTINUED | | |
|---|---|---|
| Trigger | Objective | Description |
| Tax recurrence | Product Sales | Tax refunds of at least $10,000 in the past two years, trigger is refreshed on a yearly basis |
| Tax rebate/refund (TAX) | Product Sales | Tax rebates (federal and state) |
| Tax refund having total transaction amount >/= $1,000 (T11) | Product Sales | Tax refunds with total transaction amount greater than or equal to $1,000 |
| Insurance (INS) | Product Sales | Payments to an insurance company |

*FIG. 7I*

| TRIGGER TABLE 5 | | |
|---|---|---|
| Trigger | Objective | Description |
| First time unavailable funds | Policy Education | Account costs for unavailable funds incurred for the first time in the last six months |
| First time account gone to loss | Policy Education | Account costs for account gone to loss incurred for the first time in the last six months |
| Unavailable funds | Policy Education | Account costs for unavailable funds incurred |
| Account gone to loss | Policy Education | Account costs for account gone to loss incurred |

↓ FROM FIGURE 11C

| 17 | AFFORDABLE TRUCKS AND EQUIPMENT | AFFORDABLE TRUCKS AND EQUIPMENT |
|---|---|---|
| 18 | AFFORDABLE UPHOLS | AFFORDABLE UPHOLS |
| 19 | AFFORDABLE USED CARS TRUCKS | AFFORDABLE USED CARS TRUCKS |
| 20 | AVIANCA | AVIANCA |
| 21 | AVIANCA | AVIANCA |
| 22 | AVIANCA | AVIANCA |

Console C:/Users/Desktop/Clustering Experiments/Clustering Demo/
```
> setwd("c:\users\\desktop\\Clustering experiments\\Clustering demo")
> mydata <- (t(read.xlsx("Clustering Flow.XLSX" , 1)))
>
> data <- as.data.frame(mydata)
> colnames(data)<-c("hmm")
> view(data)
> view(data)
> data$busmm <- gsub("[^[:alpha:];]"," ",data$hmm)
> data$busmm <- gsub("\\s+"," ",data$busmm)
> data$busmm - toupper (data$busmm)
> view(data)
>
```

R Script ▼

User Library

| | obind | Combine Multidimensional Arrays | 1.4-3 | ⊗ |
| □ | acepack | ace() and avas() for selecting regression transformations | 1.3-3.3 | ⊗ |
| □ | ape | Analyses of Phylogenetics and Evolution | 3.3 | ⊗ |
| □ | aqp | Algorithms for Quantitative Pedology | 1.8-6 | ⊗ |
| □ | assertthat | Easy pre and post assertions. | 0.1 | ⊗ |
| □ | BH | Boost C++ Header Files | 1.58.0-1 | ⊗ |
| □ | bitops | Bitwise Operations | 1.0-6 | ⊗ |
| □ | blockcluster | Coclustering package for binary, contingency, continuous and categorical data-sets | 3.0.2 | ⊗ |
| □ | boot | Bootstrap Functions | 1.3-15 | ⊗ |
| □ | brew | Templating Framework for Report Generation | 1.0-6 | ⊗ |
| □ | chron | Chronological objects which can handle dates and times | 2.3-45 | ⊗ |
| □ | circular | Circular Statistics | 0.4-7 | ⊗ |
| □ | class | Functions for Classification | 7.3-12 | ⊗ |
| □ | cluster | Cluster Analysis Extended Rousseeuw et al. | 2.0.1 | ⊗ |
| □ | codetools | Code Analysis Tools for R | 0.2-11 | ⊗ |
| □ | colorspace | Color Space Manipulation | 1.2-6 | ⊗ |

| | | |
|---|---|---|
| agp | Algorithms for Quantitative Pedology | 1.8-6 |
| assertthat | Easy pre and post assertions. | 0.1 |
| BH | Boost C++ Header Files | 1.58.0-1 |
| bitops | Bitwise Operations | 1.0-6 |
| blockcluster | Coclustering package for binary, contingency, continuous and categorical data-sets | 3.0.2 |
| boot | Bootstrap Functions | 1.3-15 |
| brew | Templating Framework for Report Generation | 1.0-6 |
| chron | Chronological objects which can handle dates and times | 2.3-45 |
| circular | Circular Statistics | 0.4-7 |
| class | Functions for Classification | 7.3-12 |
| cluster | Cluster Analysis Extended Rousseeuw et al. | 2.0.1 |
| codetools | Code Analysis Tools for R | 0.2-11 |
| colorspace | Color Space Manipulation | 1.2-6 |

FROM FIGURE 11E

```
Console  C:/Users/Desktop/Clustering Experiments/Clustering Demo/
> mydata <- (t(read.xlsx("Clustering Flow.XLSX" , 1)))
>
> data <- as.data.frame(mydata)
> colnames(data)<-c("bnm")
> view(data)
> view(data)
> data$busnm <- gsub("^[[:alpha:]]"," ",data$bnm)
> data$busnm <- gsub("^\\s+ ",data$busnm)
> data$busnm - toupper(data$busnm)
> view(data)
> uniq <- sqldf("select distinct busnm from data")
> uniq <- uniq[order(uniq$busnm),]
>
> vect <- as.vector(t(uniq))
> meta <- DoubleMetaphone (vect)
> metadf <- as.data.frame (meta)
>
> metadf2 <- subset (metadf, select - -c(alternate))
>
> metaprim <- cbind (uniq,metadf2)
> view(metaprim)
>
```

| | | | |
|---|---|---|---|
| ☐ | aqp | Algorithms for Quantitative Pedology | 1.8-6 |
| ☐ | assertthat | Easy pre and post assertions. | 0.1 |
| ☐ | BH | Boost C++ Header Files | 1.58.0-1 |
| ☐ | bitops | Bitwise Operations | 1.0-6 |
| ☐ | blockcluster | Coclustering package for binary, contingency, continuous and categorical data-sets | 3.0.2 |
| ☐ | boot | Bootstrap Functions | 1.3-15 |
| ☐ | brew | Templating Framework for Report Generation | 1.0-6 |
| ☐ | chron | Chronological objects which can handle dates and times | 2.3-45 |
| ☐ | circular | Circular Statistics | 0.4-7 |
| ☐ | class | Functions for Classification | 7.3-12 |
| ☐ | cluster | Cluster Analysis Extended Rousseeuw et al | 2.0.1 |
| ☐ | codetools | Code Analysis Tools for R | 0.2-11 |
| ☐ | colorspace | Color Space Manipulation | 1.2-6 |

FROM FIGURE 11G

```
Console C:/Users/Desktop/Clustering Experiments/Clustering Demo/
> data$busnm <- gsub("^[[:alpha:]]"," ",data$bnm)
> data$busnm <- gsub("^ "," ",data$bnm)
> data$busnm -toupper (data$busnm)
> view(data)
> uniq <- sqldf("select disjunct busnm from data")
> uniq <- uniq[order(uniq$busnm),]
>
> vect <- as.vector (t(uniq))
> meta <- DoubleMetaphone (vect)
> metadf <- as.data.frame (meta)
>
> metadf2 <- subset (metadf. select = -c(alternate))
>
> metaprim <- cbind (uniq,metadf2)
> view(metaprim)
> colnames(metaprim) <- c("bnm","dmp")
>
> metaprim$id <- as.numeric(as.factor(with(metaprim, paste(dmp))))
>
> idcount <- count (metaprim,"id")
> view(metaprim)
>
```

SYSTEM FOR MENDING THROUGH AUTOMATED PROCESSES

BACKGROUND

Customers of financial institutions often find it difficult to keep track of their account activities. These customers may be unaware of the details of their transactions, account balances, and account policies and may miss potential opportunities and susceptibilities associated with their accounts. For example, a customer may not realize that they are eligible for an upgraded service because they are unfamiliar with their bank's policies and products. Moreover, financial institutions usually have large volumes of data to organize and maintain, and may not have the resources to easily analyze the data and keep customers informed. Such financial institutions may miss opportunities for growth by failing to inform their customers of possible issues, offers, and product updates at the most opportune times. For example, a financial institution may fail to timely notify a customer of an investment offer and may miss an opportunity to strengthen their relationship with the customer as a consequence.

BRIEF SUMMARY

The embodiments presented herein are directed to systems and methods for transforming historical transaction data, collected in response to certain triggers, in order that it may better be used to classify business names and other textual values. For example, in the transaction data, payer and payee names may be populated with many possible permutations. The invention creates "cluster ID"s to assign patterns to specific clusters of data and evaluates whether the textual values exist in an assigned cluster. If such data cannot be assigned to a specific cluster, then a secondary process may search the Internet for the most relevant names, and depending on the accuracy and precision desired by the application, the algorithm assigns a confidence level to the matches between the names found in the Internet search and the unclassified textual value. Thus, a cluster may be assigned to the data. This process may be leveraged for other databases to identify patterns, similarities and clustering to correct data and/or augment information value.

According to embodiments of the invention, a system for transforming historical data collected in response to one or more triggering events, in order to classify textual values includes a computer apparatus including a processor and a memory; and a software module stored in the memory, comprising executable instructions that when executed by the processor cause the processor to identify one or more distinct patterns within the plurality of textual values; group the textual values based on the one or more distinct patterns, thereby forming one or more clusters; apply a similarity gauge to the textual values of each of the clusters to determine similarity or dissimilarity among the textual values of each cluster; and filter the textual values of each cluster to determine which textual values belong in each cluster and which textual values do not belong in each cluster, wherein the textual values that belong are cluster values.

In some embodiments, the instructions, when executed, further cause the processor to remove undesired characters from the textual values.

In some embodiments, identifying one or more distinct patterns within the plurality of textual values comprises comparing pronunciations and/or phonetics of the textual values. In some embodiments, comparing pronunciations and/or phonetics of the textual values comprises applying a double metaphone algorithm to the textual values.

In some embodiments, applying a similarity gauge to the textual values comprises determining a Jaccard distance score among the textual values of each cluster.

In some embodiments, the instructions when executed further cause the processor to connect the textual values that belong in each cluster; and remove the textual values that do not belong in each cluster. In some such embodiments, connecting the textual values that belong in each cluster comprises applying an OPTNET algorithm to the textual values of each cluster.

In some embodiments, filtering the textual values of each cluster comprises determining a Jaccard distance score threshold; comparing the Jaccard distance score to the Jaccard distance score threshold for each of the textual values of each cluster, thereby filtering textual values based on their similarity and/or dissimilarity.

In some embodiments, the instructions when executed further cause the processor to apply a standardized value aggregate to the cluster values of each cluster.

According to embodiments of the invention, a computer program product for transforming historical data collected in response to one or more triggering events, in order to classify textual values, the computer program product includes a computer readable storage medium having computer readable program code embodied therewith, the computer readable program code comprising computer readable program code configured to access a plurality of textual values from historical transaction data; computer readable program code configured to identify one or more distinct patterns within the plurality of textual values; computer readable program code configured to group the textual values based on the one or more distinct patterns, thereby forming one or more clusters; computer readable program code configured to apply a similarity gauge to the textual values of each of the clusters to determine similarity or dissimilarity among the textual values of each cluster; and computer readable program code configured to filter the textual values of each cluster to determine which textual values belong in each cluster and which textual values do not belong in each cluster, wherein the textual values that belong are cluster values.

In some embodiments, the computer readable program code further comprising computer readable program code configured to remove undesired characters from the textual values.

In some embodiments, identifying one or more distinct patterns within the plurality of textual values comprises comparing pronunciations and/or phonetics of the textual values.

In some embodiments, comparing pronunciations and/or phonetics of the textual values comprises applying a double metaphone algorithm to the textual values.

In some embodiments, applying a similarity gauge to the textual values comprises determining a Jaccard distance score among the textual values of each cluster.

In some embodiments, the computer readable program code includes computer readable program code configured to connect the textual values that belong in each cluster; and computer readable program code configured to remove the textual values that do not belong in each cluster. In some such embodiments, the computer readable program code includes computer readable program code configured to apply an OPTNET algorithm to the textual values of each cluster.

In some embodiments, the computer readable program code includes computer readable program code configured to determine a Jaccard distance score threshold; and computer readable program code configured to compare the Jaccard distance score to the Jaccard distance score threshold for each of the textual values of each cluster, thereby filtering textual values based on their similarity and/or dissimilarity.

In some embodiments, the computer readable program code includes computer readable program code configured to apply a standardized value aggregate to the cluster values of each cluster.

According to embodiments of the invention, a method for transforming historical data collected in response to one or more triggering events, in order to classify textual values includes accessing a plurality of textual values from historical transaction data; identifying one or more distinct patterns within the plurality of textual values; grouping the textual values based on the one or more distinct patterns, thereby forming one or more clusters; applying a similarity gauge to the textual values of each of the clusters to determine similarity or dissimilarity among the textual values of each cluster; and filtering the textual values of each cluster to determine which textual values belong in each cluster and which textual values do not belong in each cluster, wherein the textual values that belong are cluster values.

In some embodiments, the method also includes removing undesired characters from the textual values.

The features, functions, and advantages that have been discussed may be achieved independently in various embodiments of the present invention or may be combined with yet other embodiments, further details of which can be seen with reference to the following description and drawings.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIGS. 7A-7J provide tables illustrating various triggers in accordance with various embodiments of the invention;

FIGS. 11A-11L illustrate various screenshots of an administrator portal according to embodiments of the invention.

DETAILED DESCRIPTION

Introduction

Figure 1:
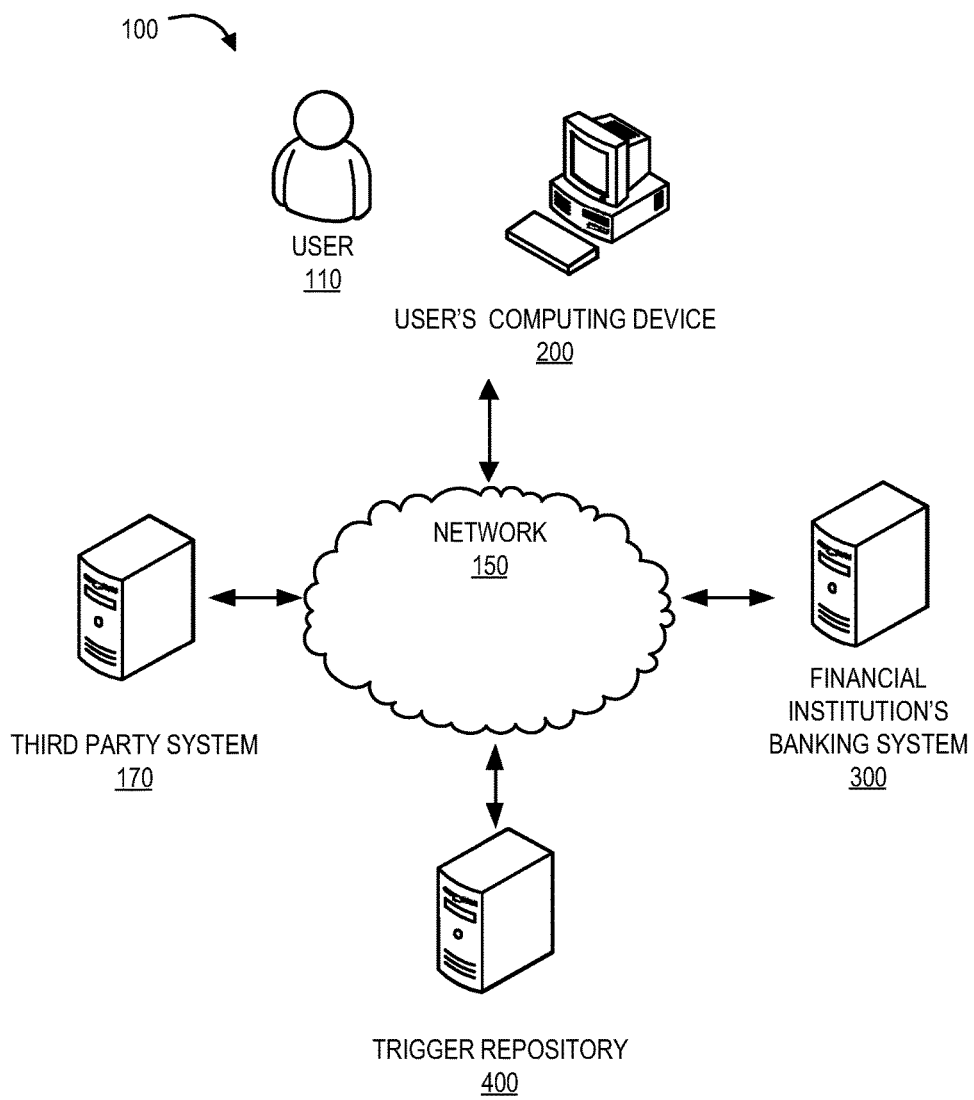
FIG. 1 provides a block diagram illustrating a trigger analysis system and environment in accordance with various embodiments of the invention.

As discussed above, the embodiments presented herein are directed to systems and methods for transforming historical transaction data, collected in response to certain triggers, in order that it may better be used to classify business names and other textual values. For example, in the transaction data, payer and payee names may be populated with many possible permutations. The invention creates "cluster ID"s to assign patterns to specific clusters of data and evaluates whether the textual values exist in an assigned cluster. If such data cannot be assigned to a specific cluster, then a secondary process may search the Internet for the most relevant names, and depending on the accuracy and precision desired by the application, the algorithm assigns a confidence level to the matches between the names found in the Internet search and the unclassified textual value. Thus, a cluster may be assigned to the data. This process may be leveraged for other databases to identify patterns, similarities and clustering to correct data and/or augment information value.

As an input, the system may receive an input list of distinct business names. The data may be cleaned by removing numerals, special characters and the like. Then, the data, e.g., business names, can undergo a three step clustering process. First, pronunciations and phonetics of the names are compared. An example of the first step is the double metaphone process, which is an algorithm to code words phonetically by reducing them to a combination of consonant sounds. The process returns two codes if a word has two plausible pronunciations, thereby reducing matching problems from wrong spellings. Once the distinct patterns are identified, they are then grouped into clusters.

Second, for each cluster, the system identifies the similar patterns in the data. In other words, the system determines how similar or dissimilar multiple strings are to one another. An example of the second step is the Jaccard distance process. This measures dissimilarity between sample strings.

Third, a function that connects similar components is applied. In other words, a cutoff may be applied in order to filter the business names that belong to the cluster and those that do not. An example of the third step is the PROC OPTNET, which helps in grouping similar entities, where the input will be pairs of common entities.

Triggers and Data Gathering

The embodiments presented herein are directed to systems and methods for the creation, institution, and management of account related triggers. In some embodiments, a system that supports ideation, sizing, design, production, and maintenance of triggers is provided. The system develops effective communication routines to aid in trigger delivery.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that enhance and maintain customer relationships with a financial institution via financial account related triggers are provided. As used herein, the term "trigger" refers to, but is not limited to, account activity, transactional data, account costs, account terms and conditions associated with one or more financial accounts, and non-financial data such as online data. Exemplary triggers include transactions and/or events associated with various accounts, such as a checking account, savings account, credit card account, retirement account, investment vehicle, or other type of account. Non-financial exemplary triggers include referrals from an online domain and online cookies. Specific events or trends in account or online activity are used to accomplish various objectives in the support and maintenance of user accounts to thereby increase user satisfaction and account profitability.

Referring now to the figures, FIG. 1 provides a block diagram illustrating a trigger analysis system and environment 100, in accordance with an embodiment of the invention. The trigger analysis environment 100 includes a user 110, and an associated computing device 200. A user of the system may be an individual account holder, an agent of the account holder, a customer of a financial institution, or any other entity that is capable of maintaining a financial account. The computing device 200 may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, or other mobile device.

The computing device 200 is configured to communicate over a network 150 with a financial institution's banking system 300 and, in some cases, a third party system 170, such as one or more other financial institution systems, a vendor's system, an online domain, a POS (point of sales) device, and the like. The user's computing device 200, the financial institution's banking system 300, and a trigger repository 400 are each described in greater detail below with reference to FIGS. 2-4. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

In general, the computing device 200 is configured to connect with the network 150 to log the user 110 into the financial institution's banking system 300, such as an online banking system. The computing device 200 is also configured to connect with the network 150 to allow the user 110 to access the third party system 170, such as an online domain. The banking system 300 involves authentication of a user in order to access the user's account on the banking system 300. For example, the banking system 300 is a system where a user 110 logs into his/her account such that the user 110 or other entity can access data that is associated with the user 110. For example, in one embodiment of the invention, the banking system 300 is an online banking system maintained by a financial institution. In such an embodiment, the user 110 can use the computing device 200 to log into the banking system 300 to access the user's online banking account. Logging into the banking system 300 generally requires that the user 110 authenticate his/her identity using a user name, a passcode, a cookie, a biometric identifier, a private key, a token, and/or another authentication mechanism that is provided by the user 110 to the banking system 300 via the computing device 200. The financial institution's banking system 300 is in network communication with other devices, such as the third party system 170 and the trigger repository 400.

In some embodiments of the invention, the trigger repository 400 is configured to be controlled and managed by one or more third-party data providers (not shown in FIG. 1) over the network 150. In other embodiments, the trigger repository 400 is configured to be controlled and managed over the network 150 by the same entity that maintains the financial institution's banking system 300. In other embodiments, the trigger repository 400 is configured to be controlled and managed over the network 150 by the financial institution implementing the trigger system of the present embodiments of the invention. In still other embodiments, the trigger repository 400 is a part of the banking system 300.

Figure 2:
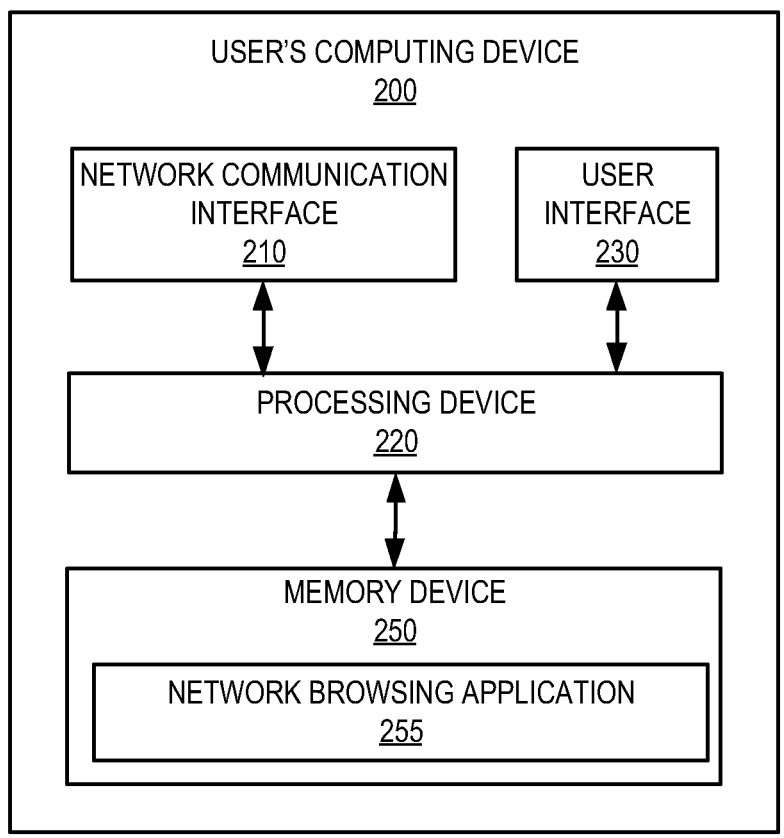
FIG. 2 provides a block diagram illustrating the user's computing device of FIG. 1, in accordance with various embodiments of the invention.

Referring now to FIG. 2, the computing device 200 associated with the user 110 includes various features, such as a network communication interface 210, a processing device 220, a user interface 230, and a memory device 250. The network communication interface 210 includes a device that allows the computing device 200 to communicate over the network 150 (shown in FIG. 1). In addition, a network browsing application 255 is stored in the memory device 250. The network browsing application 255 provides for the user to establish network communication with the banking system 300 (shown in FIG. 1) for the purpose of communicating account information to the banking system 300, in accordance with embodiments of the present embodiments of the invention.

As used herein, a "processing device," such as the processing device 220 or the processing device 320, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 or 320 may further include functionality to operate one or more software programs based on computer-executable program code thereof, which may be stored in a memory. As the phrase is used herein, a processing device 220 or 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 230 generally includes a plurality of interface devices that allow a customer to input commands and data to direct the processing device to execute instructions. As such, the user interface 230 employs certain input and output devices to input data received from the user 110 or output data to the user 110. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 250 or 350 generally refers to a device or combination of devices that store one or more forms of computer-readable media and/or computer-executable program code/instructions. Computer-readable media is defined in greater detail below. For example, in one embodiment, the memory device 250 or 350 includes any computer memory that provides an actual or virtual space to temporarily or permanently store data and/or commands provided to the processing device 220 when it carries out its functions described herein.

Figure 3:
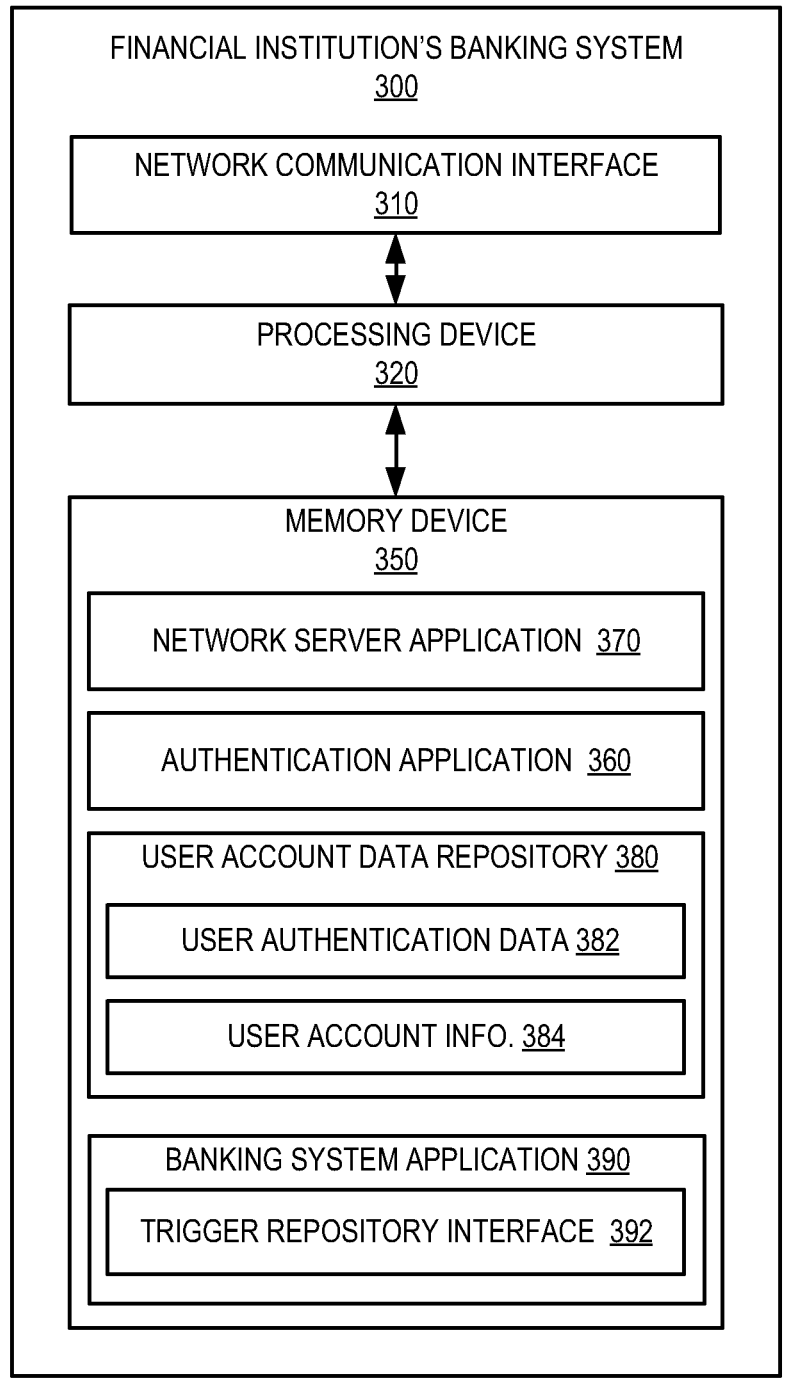
FIG. 3 provides a block diagram illustrating the financial institution's banking system of FIG. 1, in accordance with various embodiments of the invention.

FIG. 3 provides a block diagram illustrating the banking system 300 in greater detail, in accordance with embodiments of the invention. In one embodiment of the invention, the banking system 300 includes a processing device 320 operatively coupled to a network communication interface 310 and a memory device 350. In certain embodiments, the banking system 300 is operated by a first entity, such as a financial institution, while in other embodiments, the banking system 300 is operated by an entity other than a financial institution.

It should be understood that the memory device 350 may include one or more databases or other data structures/repositories. The memory device 350 also includes computer-executable program code that instructs the processing device 320 to operate the network communication interface 310 to perform certain communication functions of the banking system 300 described herein. For example, in one embodiment of the banking system 300, the memory device 350 includes, but is not limited to, a network server application 370, an authentication application 360, a user account data repository 380, which includes user authentication data 382 and user account information 384, and a banking system application 390, which includes a trigger repository interface 392 and other computer-executable instructions or other data such as a trigger software module. The computer-executable program code of the network server application 370, the authentication application 360, or the banking system application 390 may instruct the processing device 320 to perform certain logic, data-processing, and data-storing functions of the online system 700 described herein, as well as communication functions of the banking system 300.

In one embodiment, the user account data repository 380 includes user authentication data 382 and user account information 384. The network server application 370, the authentication application 360, and the banking system application 390 are configured to implement user account information 384 and the trigger repository interface 392 when monitoring the trigger data associated with a user account. The banking system application 390 includes a trigger software module for performing the steps of methods and systems 500-1100.

As used herein, a "communication interface" generally includes a modem, server, transceiver, and/or other device for communicating with other devices on a network, and/or a user interface for communicating with one or more customers. Referring again to FIG. 3, the network communication interface 310 is a communication interface having one or more communication devices configured to communicate with one or more other devices on the network 150, such as the personal computing device 200, the banking system 300, the third party system 170, and the trigger repository 400. The processing device 320 is configured to use the network communication interface 310 to transmit and/or receive data and/or commands to and/or from the other devices connected to the network 150.

Figure 4:
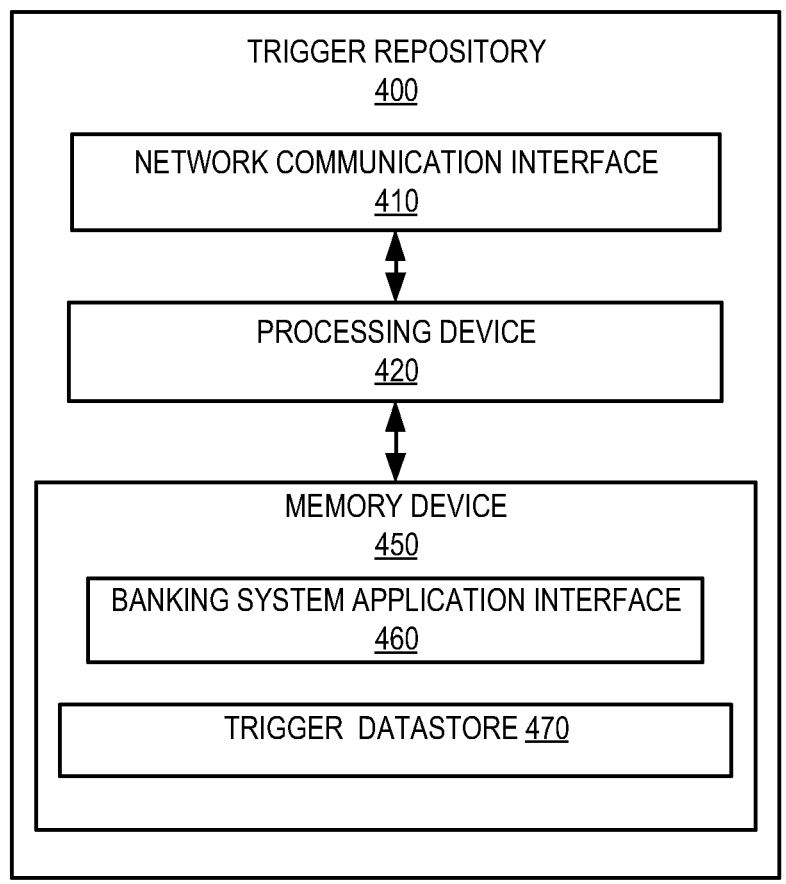
FIG. 4 provides a block diagram illustrating the trigger repository of FIG. 1, in accordance with various embodiments of the invention.

FIG. 4 provides a block diagram illustrating the trigger repository 400, in accordance with an embodiment of the invention. In one embodiment of the invention, the trigger repository 400 is operated by a second entity that is a different or separate entity from the first entity (e.g., the financial institution) that, in one embodiment of the invention, implements the banking system 300. In one embodiment, the trigger repository 400 could be part of the banking system 300. In another embodiment, the trigger repository 400 is a distinct entity from the banking system 300. As illustrated in FIG. 4, the trigger repository 400 generally includes, but is not limited to, a network communication interface 410, a processing device 420, and a memory device 450. The processing device 420 is operatively coupled to the network communication interface 410 and the memory device 450. In one embodiment of the trigger repository 400, the memory device 450 stores, but is not limited to, a banking system interface 460 and a trigger data store 470. The trigger data store 470 stores data including, but not limited to, triggers, account activity, including transaction and account costs for the user's financial institution account, other trigger related data, and mobile numbers or email address for the user's 110 account. In one embodiment of the invention, both the banking system interface 460 and the trigger data store 470 may associate with applications having computer-executable program code that instructs the processing device 420 to operate the network communication interface 410 to perform certain communication functions involving the trigger data store 470 described herein. In one embodiment, the computer-executable program code of an application associated with the trigger data store 470 may also instruct the processing device 420 to perform certain logic, data processing, and data storing functions of the application associated with the trigger data store 470 described herein. A trigger, as defined herein, is not limited to account activity, and may further include costs, policies, and conditions associated with an account and online data.

The network communication interface 410 is a communication interface having one or more communication devices configured to communicate with one or more other devices on the network 150. The processing device 420 is configured to use the network communication interface 410 to receive information from and/or provide information and commands to the user's computing device 200, the third party system 170, the trigger repository 400, the banking system 300 and/or other devices via the network 150. In some embodiments, the processing device 420 also uses the network communication interface 410 to access other devices on the network 150, such as one or more web servers of one or more third-party data providers. In some embodiments, one or more of the devices described herein may be operated by a second entity so that the third-party controls the various functions involving the trigger repository 400. For example, in one embodiment of the invention, although the banking system 300 is operated by a first entity (e.g., a financial institution), a second entity operates the trigger repository 400 that stores the trigger details for the customer's financial institution accounts and other information about users.

As described above, the processing device 420 is configured to use the network communication interface 410 to gather data from the various data sources. The processing device 420 stores the data that it receives in the memory device 450. In this regard, in one embodiment of the invention, the memory device 450 includes datastores that include, for example: (1) triggers associated with a user's financial institution account numbers and routing information, (2) information about sending and receiving users' mobile device numbers, email addresses, or other contact information, which may have been received from the banking system 300, and (3) online data such as browser cookies associated with the user's computing device 200.

Turning now to the production of triggers, in some embodiments, trigger ideas are formulated and undergo a preliminary review. The ideas may be formulated internally, such as by a team of analysts of a financial institution, or the ideas may be formulated externally by segment, channel, and marketing partners of a financial institution. The ideas are prioritized based on an opportunity analysis. For example, transaction channels, transaction categories, business names, amount thresholds, stability, and violation frequencies are selected to determine and quantify opportunities that can be generated from the trigger ideas. These opportunities, such as customer retention and policy education, may be analyzed in view of preferred, retail, and small business demographics. Based on the opportunity review, triggers are developed through rigorous testing. For example, tests may be conducted on transactions associated with a specific account or user. Further, triggers that are similar in scope and that overlap over the same time period may be monitored to further develop the trigger. The results of the testing may then be reviewed to finalize the triggers. In some embodiments, the triggers are modified for automation. For example, the code for automating the triggers may be embellished and specific parameters provided. In further embodiments, the automated triggers are monitored. For example, content and process quality trigger checks can be run on a daily, weekly, bi-weekly, and/or monthly basis.

Trigger End to End 5 Step Process

Figure 5A:
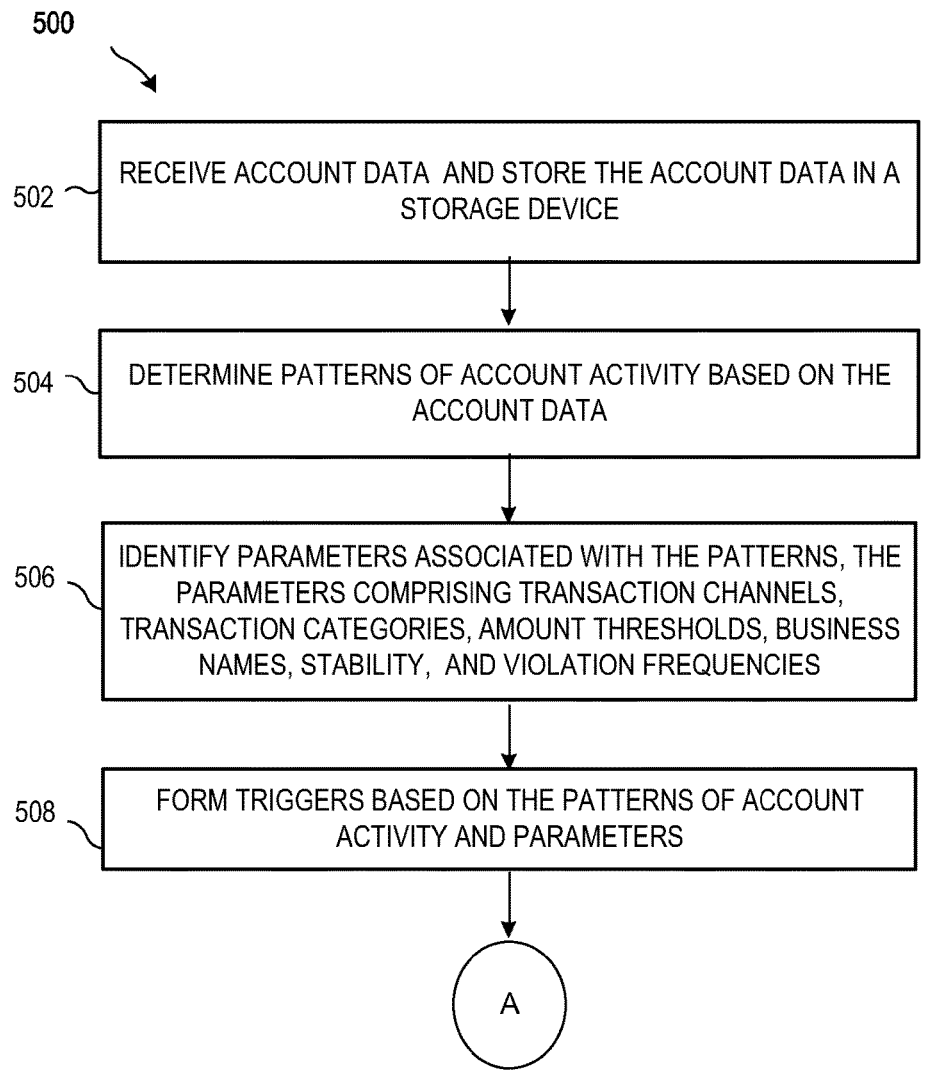
FIGS. 5A-5B are flowcharts illustrating a system and method for producing and maintaining triggers in accordance with various embodiments of the invention.
Figure 5B:
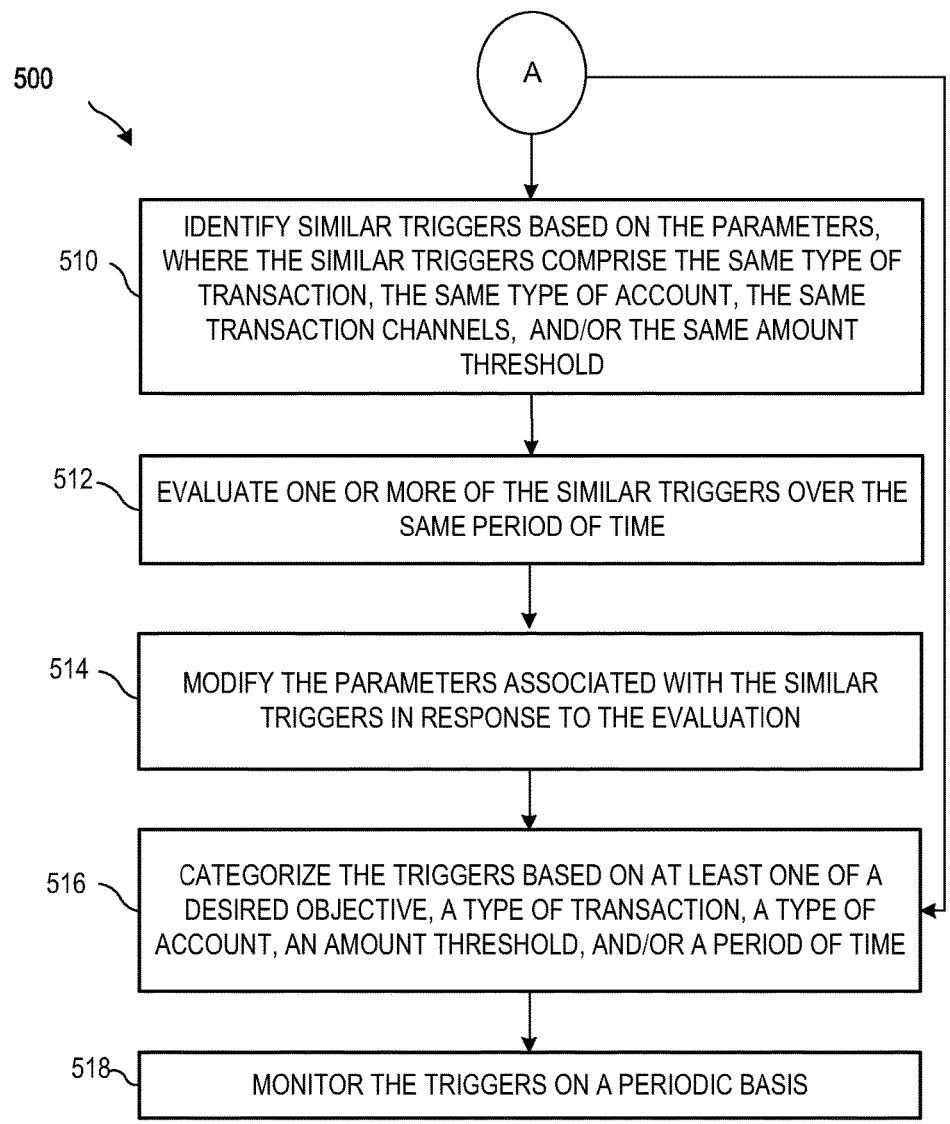

FIGS. 5A-5B are flowcharts providing an overview of a system and method 500 for producing and maintaining triggers. One or more devices, such as one or more mobile devices and/or one or more other computing devices and/or servers, can be configured to perform one or more steps of the method 500, as well as the methods 600-1100. In some embodiments, the one or more devices performing the steps are associated with a financial institution. In other embodiments, the one or more devices performing the steps are associated with a business, partner, third party, and/or user.

As shown in FIG. 5A, at block 502, account data is received and stored in a storage device (e.g., the user account data repository 380 or the trigger repository 400). A used herein, "account data" includes, but is not limited to any data associated with one or more financial accounts such as transaction amounts, inbound transactions, outbound transactions, transaction channels, transaction categories, transaction dates, identification of third parties to a transaction, payee names, purpose of transactions, transaction transfer data, types of accounts, costs associated with the account, account balances, and the like. The account data may be received from the user, merchants, other financial institutions such as credit card companies, or any other entity.

In block 504, patterns of account activity are determined based on the account data. The account activity, in some embodiments, is specifically linked to a transaction category, transaction type, transaction amount, or transaction channel. For example, algorithms may be used to detect upward or downward trends in the number of transactions, the amount of transactions, the occurrence of account costs, or other account activity over a period of time. Deposit amounts for a particular account, for example, may increase during the month of April for several years in a row and provide an indication that the account user has received a tax refund.

In block 506, parameters associated with the patterns are identified, where the parameters include transaction channels, transaction categories, amount thresholds, business names, stability, and violation frequencies. The parameters are identified, in some embodiments, by using algorithms, keywords, Boolean, transaction channel codes, transaction amount calculations, and threshold amounts to search the account data related to the patterns of account activity. The keywords include business names, merchant names, third party financial institution names, web addresses, transaction dates, transaction amounts, user identification, account identification, and the like.

Transaction channels include transaction processes such as electronic funds transfers, automatic deposits and withdrawals, ATM withdrawals and deposits, point-of-sale (POS) purchases, and the like. For example, triggers directed to deposit transactions may include transaction channel parameters such as teller deposits, ATM deposits, ACH deposits, internal transfers, automatic transfers, and pay roll transfers.

Transaction categories include transactions that are grouped according to a desired outcome or purpose. Exemplary transaction categories include user retention, increasing a user's transactional depth or account breadth, timely identification of outside transactions, new products, risk mitigation, policy education, and the like.

The amount thresholds include predetermined amounts associated with one or more transactions such as minimum and/or maximum percent, total, average, or median limits for quantities or values associated with one or more transactions. For example, some parameters may require that all purchases be over a minimum $100 limit and/or under a $10,000 limit. The stability parameters provide an indication of transactions that perform consistently over time, or an indication of transactions that have been adjusted to remove variations in activity over time. For example, the stability parameters may include a range of percentages, ratios, transaction amounts, and frequencies that fall within specific tolerances and that are linked to specific transactions that are tracked over time. Parameters of violation frequencies indicate the frequency of outliers, unexpected events, and negative results in account activity. For example, if the number of ATM withdrawals for a particular account has gradually decreased from six per month to one per month over the last seven months, seven ATM withdrawals on the same day of the current month would indicate a reversal in the trend and would be a violation of the trigger. The violation frequency can indicate an isolated occurrence which can be deleted or ignored from the data, or it can indicate a negative trend. Based on the violation frequency, the parameters of the triggers can be adjusted accordingly.

In block 508, triggers are formed based on the patterns of account activity and the parameters. In some embodiments, the patterns of account activity and the parameters are used to define the triggers. For example, a trigger may be defined by the total monthly number of ATM deposits that occur over a three month period. Further, the patterns of account activity provide the expected trend for transactions defined by the parameters. In the previous example, the trigger may be further defined by requiring that the total monthly number of ATM deposits decrease over the three month period. The patterns of account activity and parameters selected for each trigger may be based on the objective of the trigger. Triggers directed to cross selling investment products to user, for example, may include a pattern of increasing direct deposits in a saving account over a two week period. The triggers, and the patterns and parameters that define the triggers, may take on any number of variations. Specific exemplary triggers are described in more detail below with reference to FIGS. 14A-14J.

The method 500 is further illustrated in FIG. 5B. In block 510, similar triggers are identified based on the parameters, where the similar triggers comprise the same type of transaction, the same type of account, the same transaction channels, and/or the same amount threshold. In some embodiments, the similar triggers are associated with one or more accounts and/or one or more users. The similar triggers can be associated with a single account or user, or multiple accounts of the same or different users. For example, a similar trigger may include all payment transactions associated with a particular user, where the payment transactions include use of a credit card, a checking account, or other account. In further embodiments, the similar triggers are identified based on a transaction category.

In block 512, one or more of the similar triggers are evaluated over the same period of time. The evaluation of the similar triggers over the same time periods strengthens the trigger data such that any potential flaws, improvements, or strengths in the data are highlighted. In one example, electronic fund transfers associated with multiple accounts are monitored every day over the same six month period. In this way, the number of times the trigger should be run in a week or month, the days of the week for running the trigger, and any discrepancies in the data that occur during particular days of the week, weeks of the month, and months of the year are determined. In some embodiments, a first group of similar triggers is compared to a second group of similar triggers. For example, a group of similar outbound transaction triggers may be compared to a group of similar inbound transaction triggers. In another example, automatic deposits that occur on Mondays may be compared to automatic deposits that occur on Fridays.

In block 514, the parameters associated with the similar triggers are modified in response to the evaluation of the one or more of the similar triggers over the same period of time. One or more of the parameters for a particular trigger can be added or removed and/or the terms of the parameters can be adjusted. Holidays and weekends, for example, may cause discrepancies in the preliminary trigger data and may be taken into account when defining the trigger. Even after the triggers are preliminarily established, the triggers may be continuously monitored on a regular basis as discussed in more detail below with regard to FIGS. 6A-6B.

In block 516, the triggers are categorized based at least on one of a desired objective, a type of transaction, a type of account, an amount threshold, and/or a period of time. In some embodiments, a first group of similar triggers and a different second group of similar triggers are categorized based on the desired objective. For example, ATM deposits may be categorized with payments for education if the purpose of the triggers is to offer the user a loan with a lower interest rate. The triggers categorized according to the desired objective are further categorized according to the type of transaction, the type of account, the amount threshold, and the period of time. In the example above, the ATM deposits used as triggers for the purpose of loan offers may be further categorized according to the amounts of the deposits. In block 518, the categorized triggers are monitored on a period basis, as discussed in further detail below with regard to FIGS. 6A-6B.

Real Time Monitor for Trigger Data Quality

Figure 6A:
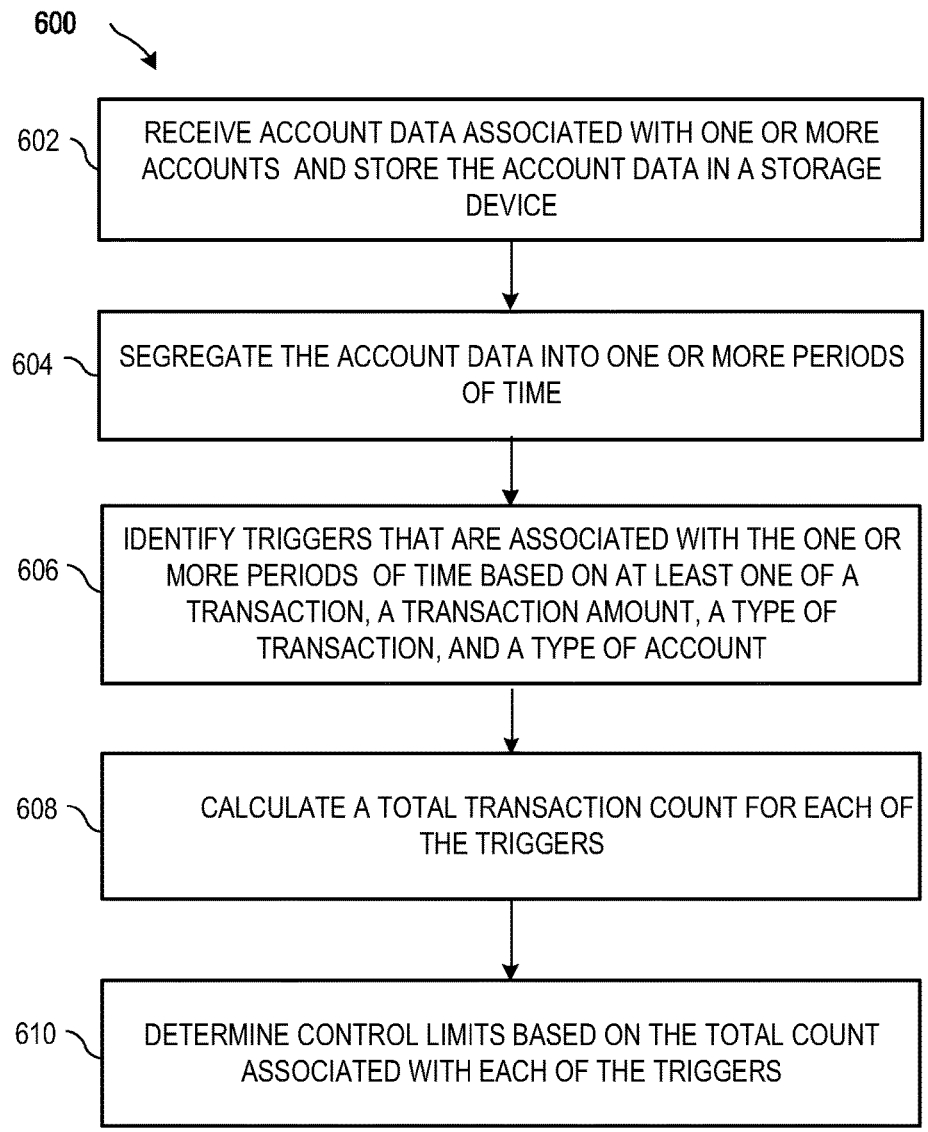
FIGS. 6A-6B are flowcharts illustrating a system and method for monitoring trigger data quality in accordance with various embodiments of the invention.
Figure 6B:
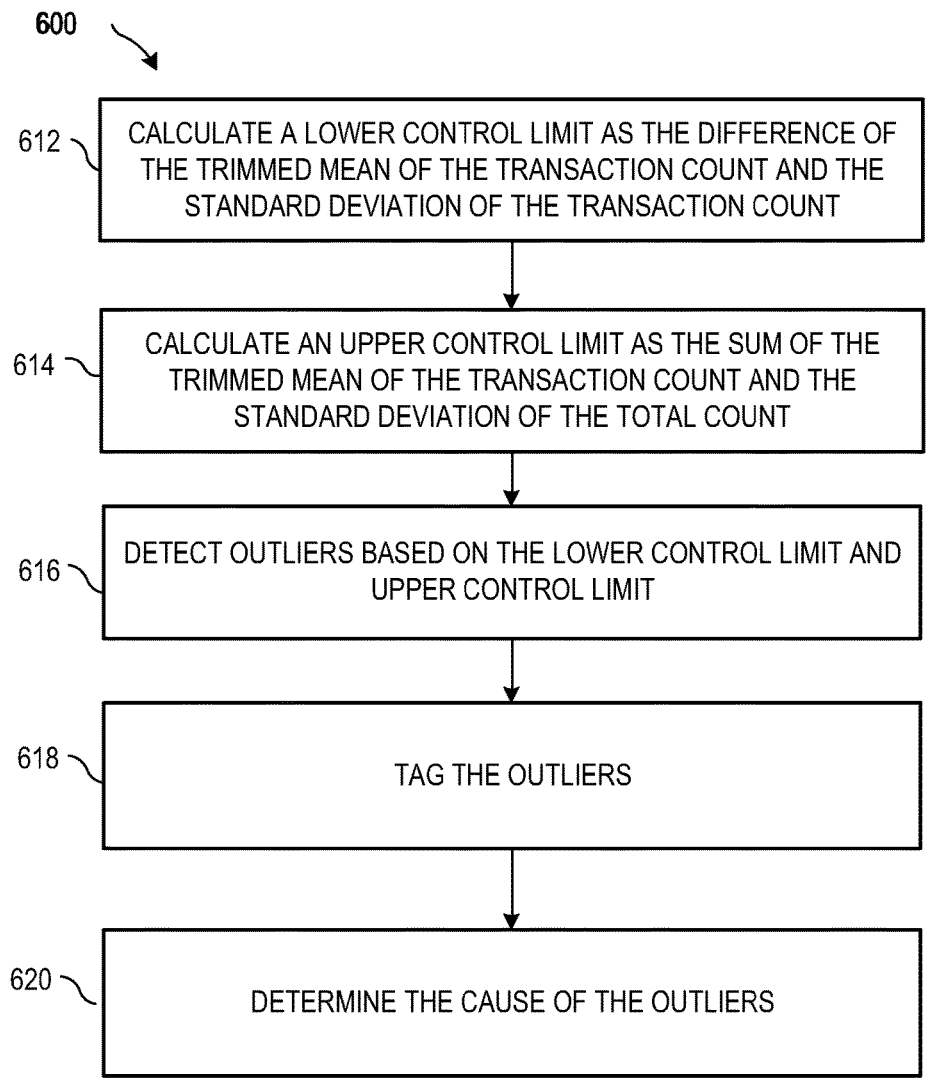

Referring now to FIGS. 6A-6B, flowcharts providing an overview of a system and method 600 for monitoring trigger data quality are provided. Because triggers have a very short life span, poor quality of data can lead to ineffective marketing and/or loss in revenue. The method 600 ensures that the right data is included in the triggers and detects potential definitional and process flaws in the triggers. The method 600 detects and reports whether the current trigger counts are normal or flawed in real time. The method 600 monitors the triggers to determine the accuracy, completeness, domain of values, and format of the trigger data. The triggers are further monitored to determine the relevance of the trigger metrics within a business context and explain how the metric score correlates to business performance. Also, the method 600 evaluates the soundness of all transformation processes, such as the categorization of the triggers.

In block 602 of FIG. 6A, account data associated with one or more accounts is received and stored in a storage device (e.g., the user account data repository 380 or the trigger repository 400). In block 604, the account data is segregated into one or more periods of time. For example, transactions may be divided into daily, weekly, monthly, quarterly, or yearly periods. The periods of time selected for segregating the account data are based on historical trends in the data. If deposits over $5,000 occurred only once per month over the last ten months, for example, then the data for such deposits would be segregated into monthly periods. By clustering data into specific time windows, seasonal, cyclic, and trend effects can be pinpointed as further discussed below with regard to FIG. 13A.

In block 606, triggers associated with the one or more periods of time are identified based on at least one of a transaction, a transaction amount, a type of transaction, and a type of account. In some embodiments, each set of triggers corresponding to transactions of a certain amount, and/or type are identified first and then the triggers are segregated into time periods. The triggers may be further identified based on a category corresponding to a desired objective. In some embodiments, the triggers are identified based on transactions that occur during the one or more periods of time. For example, a trigger may include all inbound transactions that have values that are greater than a threshold amount and that occur during the month of July.

In block 608, a total transaction count for each of the triggers is calculated. The transaction counts include value amounts for certain transactions associated with one or more accounts or the total number of certain transaction associated with the one or more accounts. In some embodiments, the transaction count is the total number of transactions that occur during the one or more period of time and that are associated with a particular trigger.

Exemplary graphical charts of total counts for a tax refund trigger are illustrated in FIG. 13A. In the Monday Series chart, the total transaction counts associated with tax refund triggers for the Mondays of every month of a particular year are charted. In the Friday Series chart, the total transaction counts associated with tax refund triggers for the Fridays of every month for the same particular year are charted. The data for Monday tax refunds can be compared to data for Friday tax refunds. The transaction counts for tax refund triggers during the months of February, March, April and May are much higher than the transaction counts for tax refunds during the rest of the year. And as shown in the Friday Series and Monday Series charts, the number of tax refunds is much higher on average for the Fridays in February to May than they are for the Mondays of the same period. Based on this data, the timing for sending users notifications of investment opportunities and product offers, for example, can be finely tuned such that the user receives offers at the most opportune times.

In block 610, control limits based on the transaction count for each of the triggers is determined. The control limits are calculated based on trimmed mean and standard deviation. Trimmed mean is calculated by removing a certain percent from the lowest percent of values and an equal certain percent from the highest percent of values in a give data series before calculating the mean. In calculating the trimmed mean, some of the lower numbers of the transaction count and some of the higher numbers of the transaction count are removed before the mean is calculated. For example, tax refund transactions that occur on a Friday and that have a value that is a certain percent higher or lower than the median for all tax refunds that occur on the same Friday are deleted before the mean is calculated.

FIG. 6B is a flowchart further illustrating the method and system 600. In block 612, a lower control limit is calculated as the difference of the trimmed mean of the transaction count and the standard deviation of the transaction count. In block 614, an upper control limit is calculated as the sum of the trimmed mean of the total count and the standard deviation of the total count. In block 616, outliers are detected based on the lower control limit and the upper control limit.

An exemplary table illustrating the transaction count and control limits is shown in FIG. 13B. The issue tracking table shows Trigger-1, Trigger-2, and Trigger-3, which are listed according to the date and the week day on which they occur. A lower control limit (LCL), a transaction count, and an upper control limit (UCL) are calculated daily for each trigger. The transaction count is the total number of transactions that occur for each of the Triggers 1-3 in a given day. Although a daily trigger data quality check is illustrated, it will be understood that the trigger check may be run on a weekly, monthly, or other time period basis. The LCL and UCL indicate whether a particular trigger is an outlier or a normal trigger. For example, Trigger-1 on Thursday, December 1 is tagged with an outlier alert based on the LCL and UCL numbers. The normal LCL for Trigger-1 on Thursday, December 8 is higher than the outlier LCL on December 1, and the normal UCL is lower than the outlier UCL on December 1. For triggers tagged as normal, the LCL and UCL remain constant from period to period. As shown in the table, normal Trigger-2 on Friday, December 2 and normal Trigger-2 on Friday, December 9 each has the same LCL and UCL numbers even though the total count for each day is different.

In block 618, the outliers are tagged. The outliers may be tagged as "outlier" as illustrated in the exemplary table of FIG. 13B or "fail" and suppressed automatically. In some embodiments, alerts are sent to analysts. For example, reports, graphs, tables, or other notifications may be sent to analysts for further processing. The analysts may decide to segregate, delete, modify, or retain the tagged or untagged trigger data. For example, one or more transactions associated with a particular trigger may be deleted and the transaction count recalculated for that particular trigger. In other embodiments, the triggers that exhibit a normal pattern and that are within confidence limits are tagged as "normal" or "pass."

In block 620, the cause of the outliers is determined. Periods of time around holidays, cyclic considerations such as tax season, days of the week, weeks of the month, certain historical trends, data obtained from the user, and external data can indicate the cause for the outliers. For example, historical trends may indicate that the number of mortgage payments is higher at the end of the month than at the beginning of the month and the number of ATM withdrawals may be higher on Fridays than it is on Tuesdays. As another example, triggers that include transactions having a specific threshold amount of $10 or greater may have a higher number of transactions during a particular period because a greater number of low end transactions (e.g., transaction of $10 to $12) occur during that period. Based on the cause of the skewed data, appropriate action can be taken. For example, the threshold amount or some other parameter associated with the trigger may be modified or certain triggers associated with a particular day of the week or other period may be tagged as normal even though these certain triggers would appear to be abnormal. Taking the $10 or greater trigger example described above, for example, the threshold amount for that trigger may be increased during the particular period or marked as normal. If the cause of the outliers is not easily explained or if the cause is unexpected, then further investigation may be required.

Although the triggers described herein generally include financial transactions associated with one or more accounts, such as the triggers illustrated in FIGS. 7A-7J, it will be understood that the triggers may also include non-financial data such as online data. For example, online referrals from an online domain or partner website may be used as triggers.

A user, in one example, may be referred to or redirected to a banking web site or online product from a student preparatory web site. In another example, a system may be given permission to use browser cookies associated with the user's device to track non-financial and/or financial online activity.

Mending Through Automated Processes

As discussed above, the embodiments presented herein are directed to systems and methods for transforming historical transaction data, collected in response to certain triggers, in order that it may better be used to classify business names and other textual values. For example, in the transaction data, payer and payee names may be populated with many possible permutations. The invention creates "cluster ID"s to assign patterns to specific clusters of data and evaluates whether the textual values exist in an assigned cluster. If such data cannot be assigned to a specific cluster, then a secondary process may search the Internet for the most relevant names, and depending on the accuracy and precision desired by the application, the algorithm assigns a confidence level to the matches between the names found in the Internet search and the unclassified textual value. Thus, a cluster may be assigned to the data. This process may be leveraged for other databases to identify patterns, similarities and clustering to correct data and/or augment information value.

As an input, the system may receive an input list of distinct business names. The data may be cleaned by removing numerals, special characters and the like. Then, the data, e.g., business names, can undergo a three step clustering process. First, pronunciations and phonetics of the names are compared. An example of the first step is the double metaphone process, which is an algorithm to code words phonetically by reducing them to a combination of consonant sounds. The process returns two codes if a word has two plausible pronunciations, thereby reducing matching problems from wrong spellings. Once the distinct patterns are identified, they are then grouped into clusters.

Second, for each cluster, the system identifies the similar patterns in the data. In other words, the system determines how similar or dissimilar multiple strings are to one another. An example of the second step is the Jaccard distance process. This measures dissimilarity between sample strings.

Third, a function that connects similar components is applied. In other words, a cutoff may be applied in order to filter the business names that belong to the cluster and those that do not. An example of the third step is the PROC OPTNET, which helps in grouping similar entities, where the input will be pairs of common entities.

Figure 8:
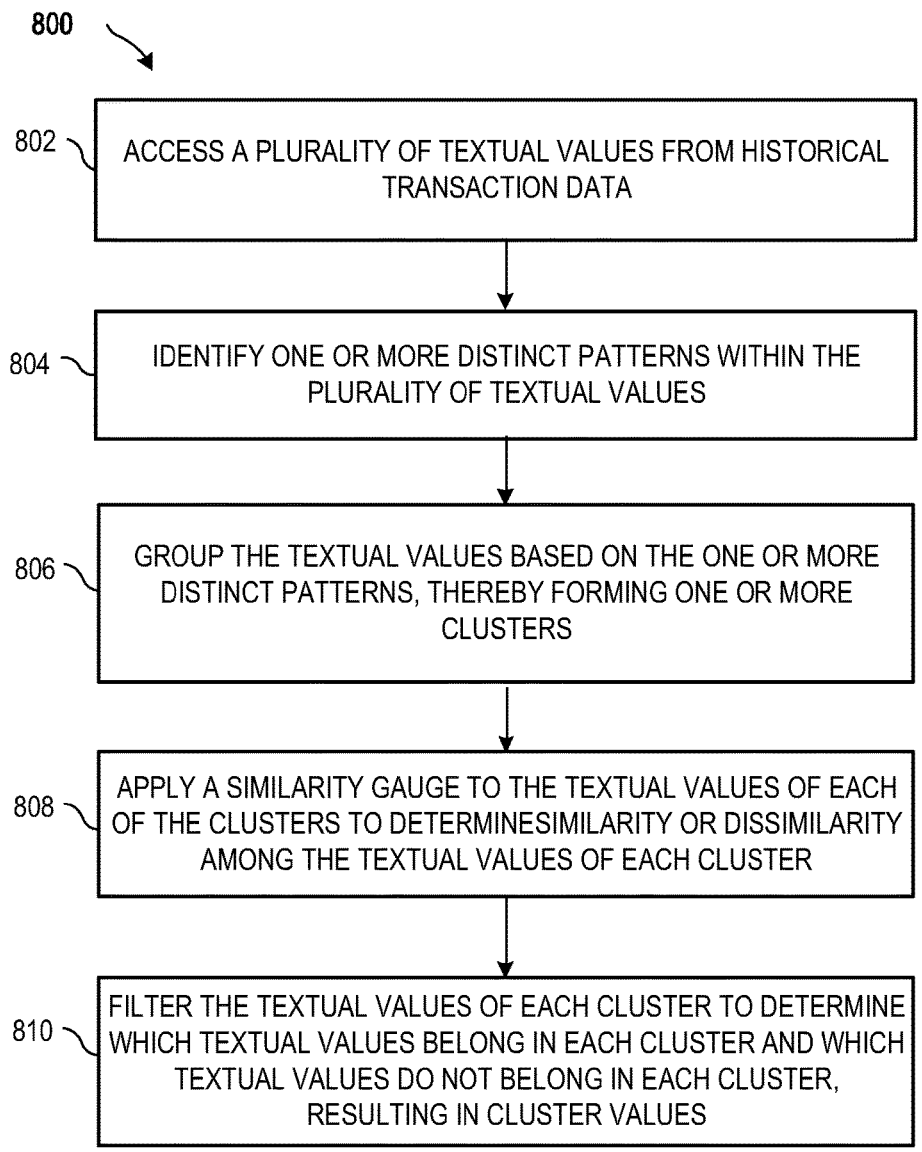
FIG. 8 is a flowchart illustrating a method for transforming historical data collected in response to one or more triggering events in order to classify textual values according to embodiments of the invention.

Referring now to FIG. 8, a method 800 for transforming historical data collected in response to one or more triggering events in order to classify textual values is illustrated according to embodiments of the invention. The first step, represented by block 810, is to access a plurality of textual values from historical transaction data. The next step, represented by block 804, is to identify one or more distinct patterns within the plurality of textual values. The next step, represented by block 806, is to group the textual values based on the one or more distinct patterns. This forms one or more clusters. Next, as represented by block 808, is to apply a similarity gauge to the textual values of each of the clusters to determine similarity and/or dissimilarity among the textual values of each cluster. Finally, as represented by block 810, the last step is to filter the textual values of each cluster to determine which textual values belong in each cluster and which textual values do not belong in each cluster. Those values that do belong in the cluster are called cluster values.

Figure 9:
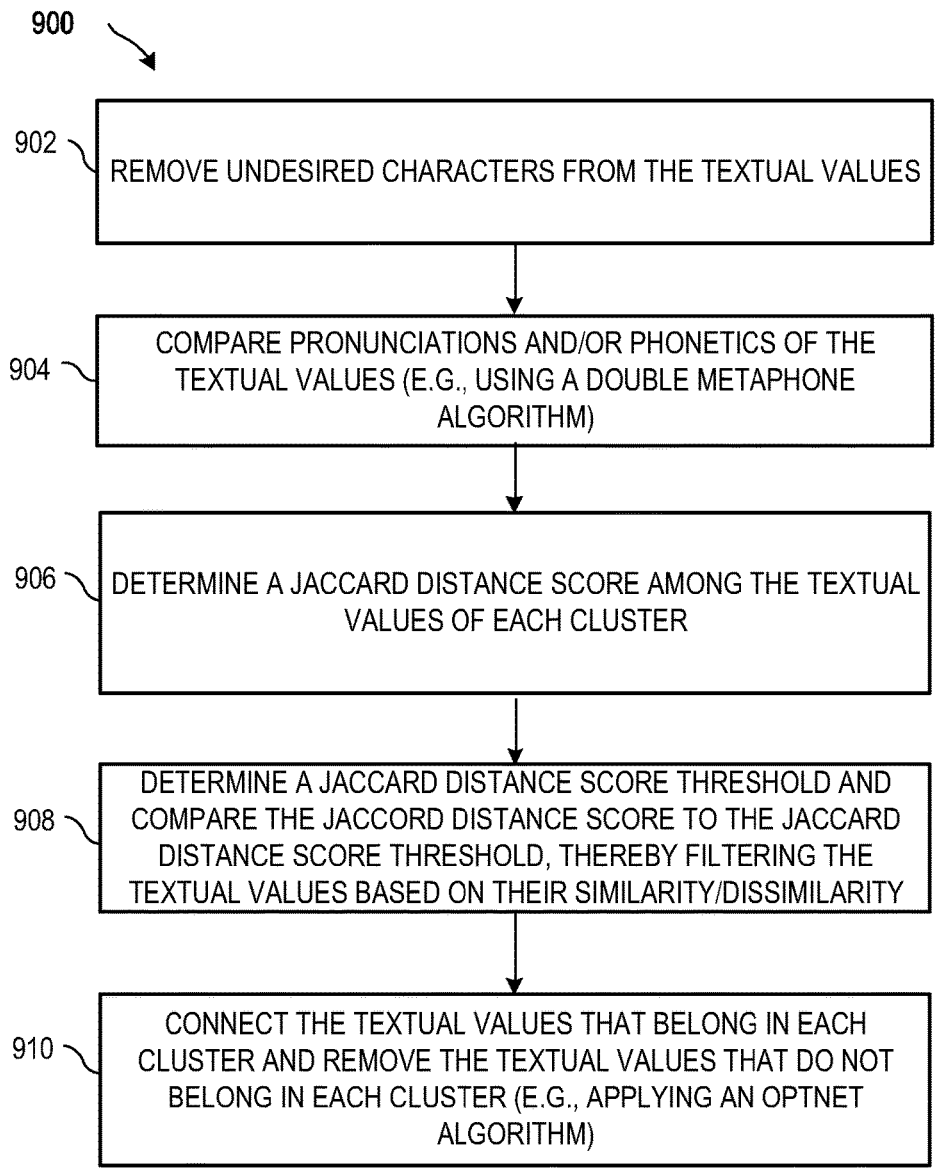
FIG. 9 is a flowchart of another method for transforming historical data collected in response to one or more triggering events in order to classify textual values according to embodiments of the invention.

Referring now to FIG. 9, another method for transforming historical data collected in response to one or more triggering events in order to classify textual values is illustrated according to embodiments of the invention. The first step, as represented by block 902, is to remove undesired characters from the textual values. Next, as represented by block 904, is to compare pronunciations and/or phonetics of the textual values. For example, the comparison may be performed using a double metaphone algorithm or the like. Next, as represented by block 906, is to determine similarity and/or dissimilarity among the textual values of each cluster, which may be done, for example, by determining a Jaccard distance score among the textual values of each cluster. Then, as represented by block 908, the next step is to determine a Jaccard distance score threshold and compare it to the Jaccard distance score. This filters the textual values based on their similarity and/or dissimilarity to the other values in the cluster. Finally, as represented by block 910, the last step is to connect the textual values that belong in each cluster and remove the textual values that do not belong in each cluster. For example, an OPTNET algorithm may be applied to do so.

In some embodiments, a standardized value aggregate is applied to the cluster values of each cluster. This may be done, for example, by searching the Internet for the names most relevant to the clusters. Depending on the accuracy and precision desired, the algorithm assigns a confidence level to the matches between the names found in the Internet search and the unclassified text value. The cluster may be assigned a business name, which may also be referred to herein as a business name aggregate.

Figure 10A:
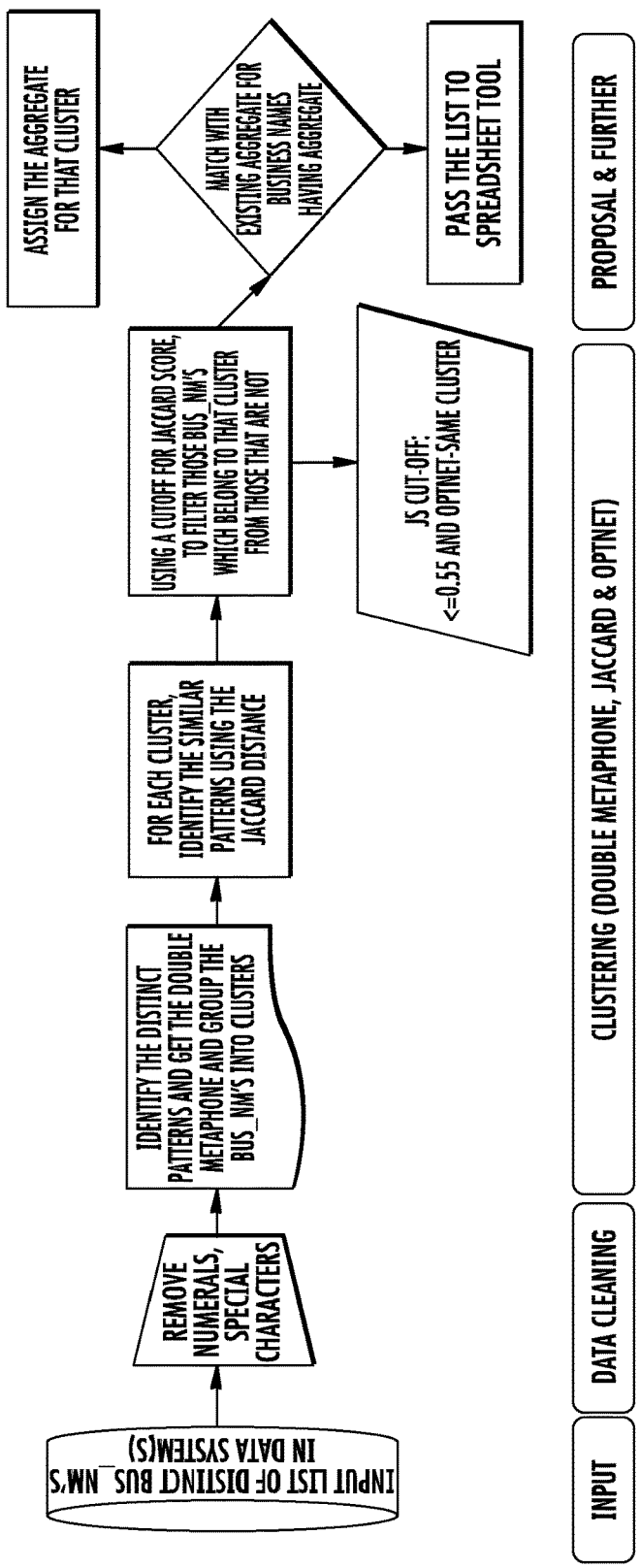
FIG. 10A is a flowchart that illustrates a process flow 1000 for clustering business name patterns according to embodiments of the invention.

Referring now to FIG. 10A, a flowchart illustrates a process flow 1000 for clustering business name patterns according to embodiments of the invention. On the lefthand side of the figures, the input is shown. The input may be a list of distinct business names in one or more data collections. Next, the data may be cleaned. Numerals and special characters may be removed from the business names. Then, clustering may be performed. The clustering process may be a three-step or more than three step process. The first step of clustering may be to identify the distinct patterns and apply a double metaphone algorithm to group the business names into clusters. For each cluster, the similar (or dissimilar) patterns may be identified using a Jaccard distance algorithm. Then, using a cutoff for the Jaccard distance score, the business names are filtered to determine which belong in the cluster and those that do not belong in the cluster. An OPTNET algorithm may be used for grouping the results into the same cluster based on the desired cutoff level, which is shown in the example as less than or equal to 0.55. Then, in some embodiments, as discussed above, a business name aggregate is assigned for the cluster and/or the list may be passed to a spreadsheet tool for further processing of business name assignment such as by Internet searching, assigning confidence levels to matches and assigning the business name aggregate to the list.

Figure 10B:
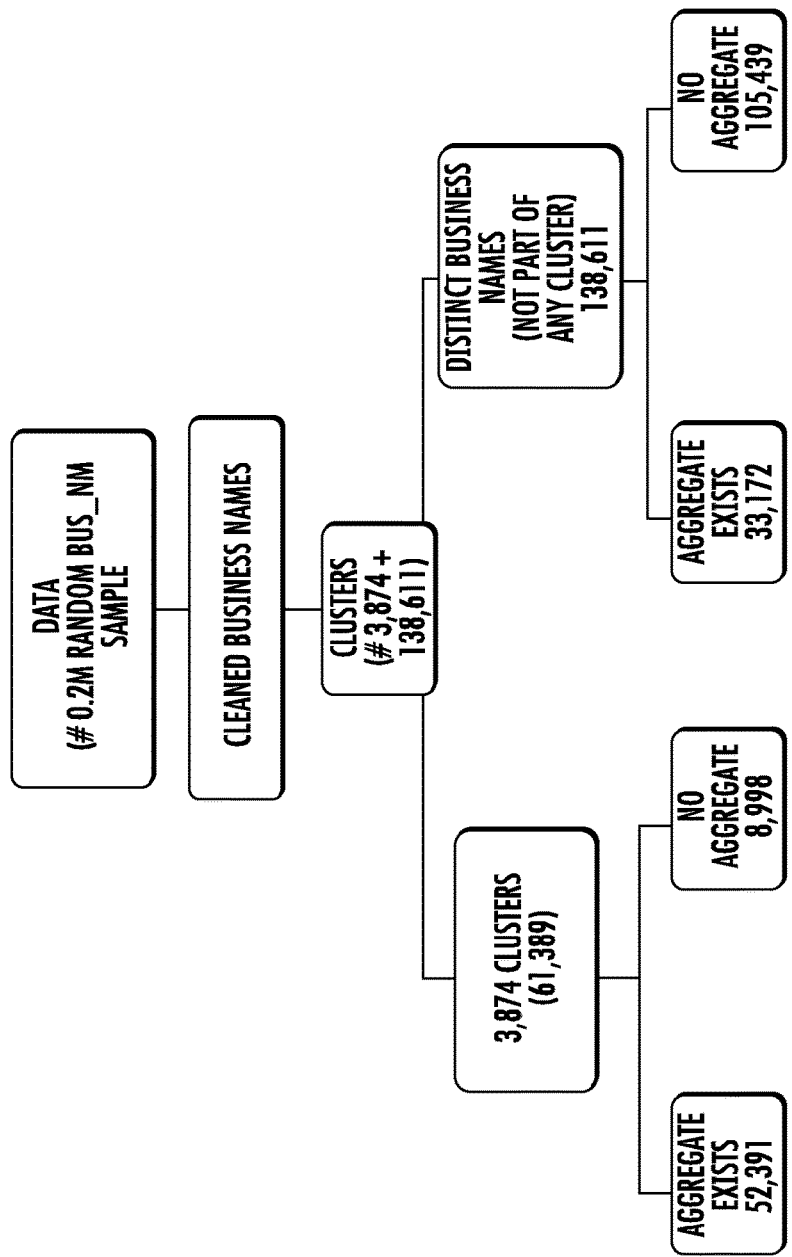
FIG. 10B is a diagram that illustrates an example showing details associated with a data collection of business names.

Referring now to FIG. 10B, a diagram illustrates an example showing details associated with a data collection of business names including information regarding number of clusters, distinct business names and whether aggregates do or do not exist for the clusters and/or distinct business names according to embodiments of the invention.

Figure 10C:
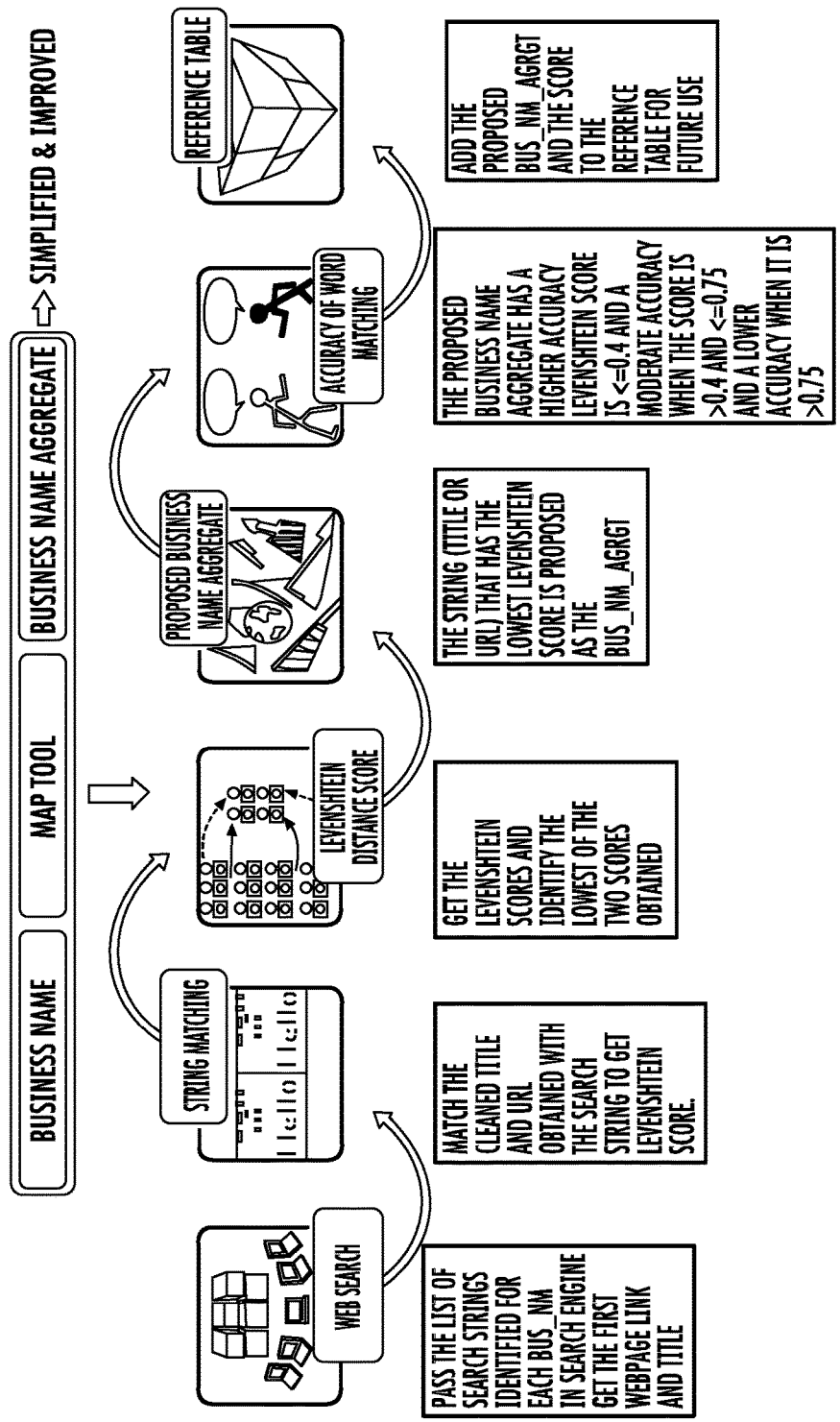
FIG. 10C is a combination flow chart and block diagram that illustrates a method 1010 for determining a business name aggregate for a cluster of data according to embodiments of the invention.

Referring now to FIG. 10C, a combination flow chart and block diagram illustrates a method 1010 for determining a business name aggregate for a cluster of data according to embodiments of the invention. First, an Internet search is performed. The list of search strings identified for each business name is passed through an Internet search engine and the first webpage link and title are noted. This is typically the first link and title that are not sponsored content of the Internet search engine. Next, strings are matched. The cleaned title and link (e.g., a URL) are both individually matched with the business name and a comparison is taken between both (i) the title and the business name; and (ii) the link and the business name. These comparisons may be quantified using a Levenshtein scoring algorithm or the like. The resulting Levenshtein scores are compared and the string (title or URL) having the lower Levenshtein score is proposed as the business name aggregate. The proposed business name aggregate has a higher accuracy when the Levenshtein score is less than or equal to 0.4 and a moderate accuracy when the score is greater than 0.4 and less than or equal to 0.75, and a lower accuracy when the score is greater than 0.75. Finally, a reference table may be created that includes the various proposed business name aggregates and their corresponding scores for future use.

Figure 10D:
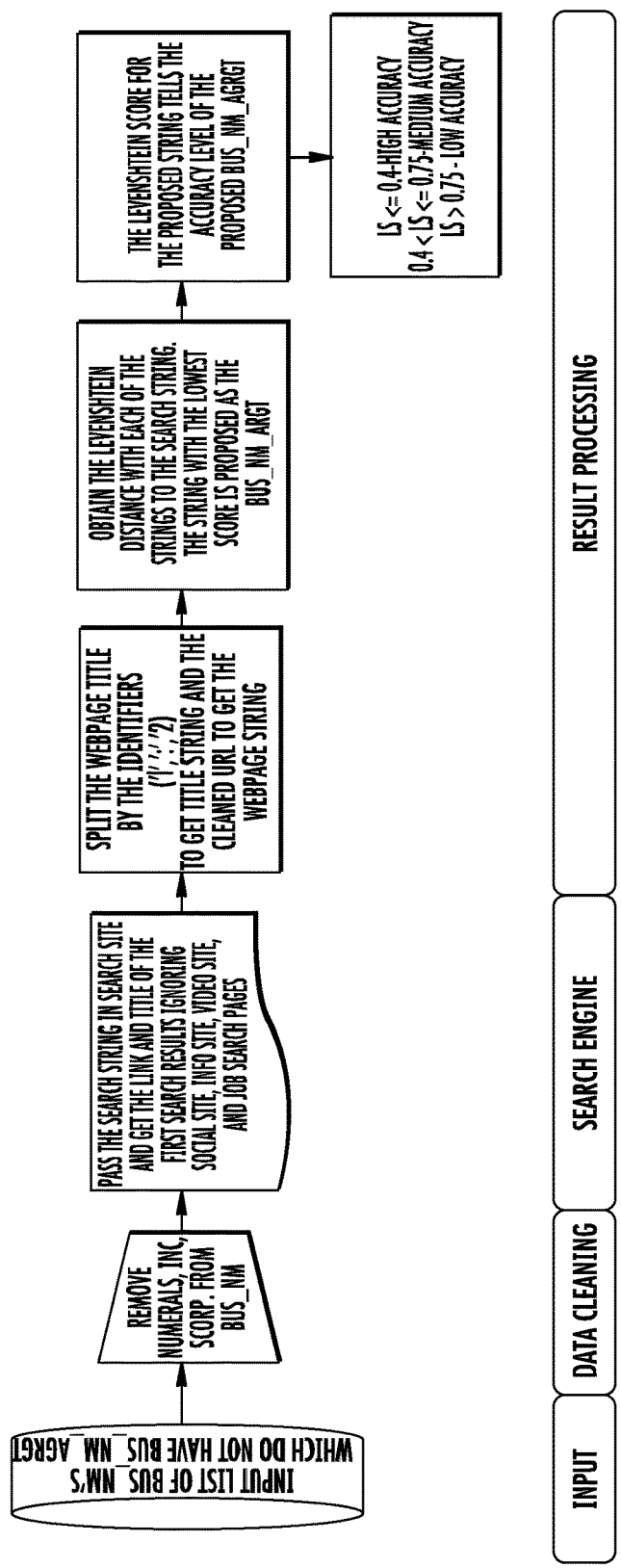
FIG. 10D is another process flow 1015 for assigning a business name aggregate according to embodiments of the invention.

Referring now to FIG. 10D, another process flow 1015 for assigning a business name aggregate is shown according to embodiments of the invention.

Figure 10E:
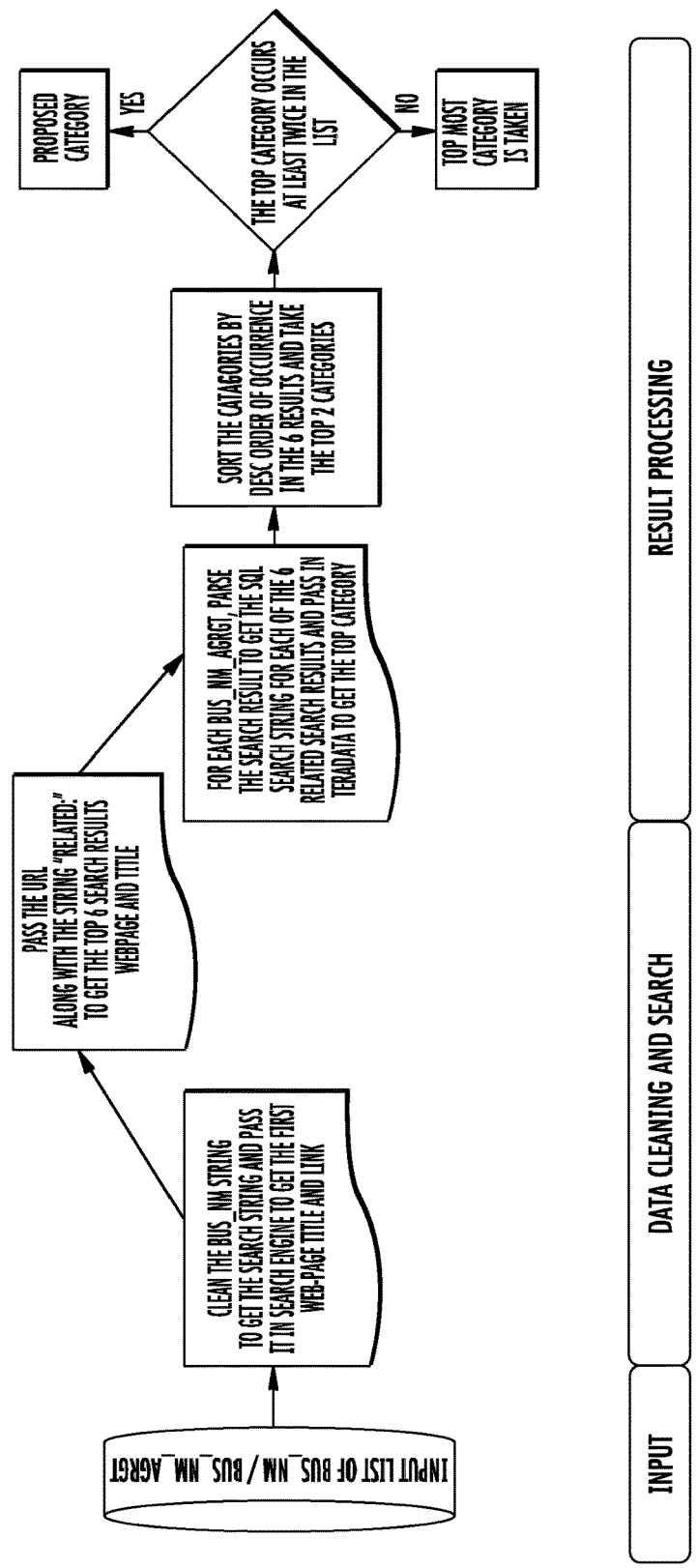
FIG. 10E is a process flow 1020 for assigning a transaction category code according to embodiments of the invention.

Referring to FIG. 10E, a process flow 1020 for assigning a transaction category code is shown according to embodiments of the invention.

Figure 11A:
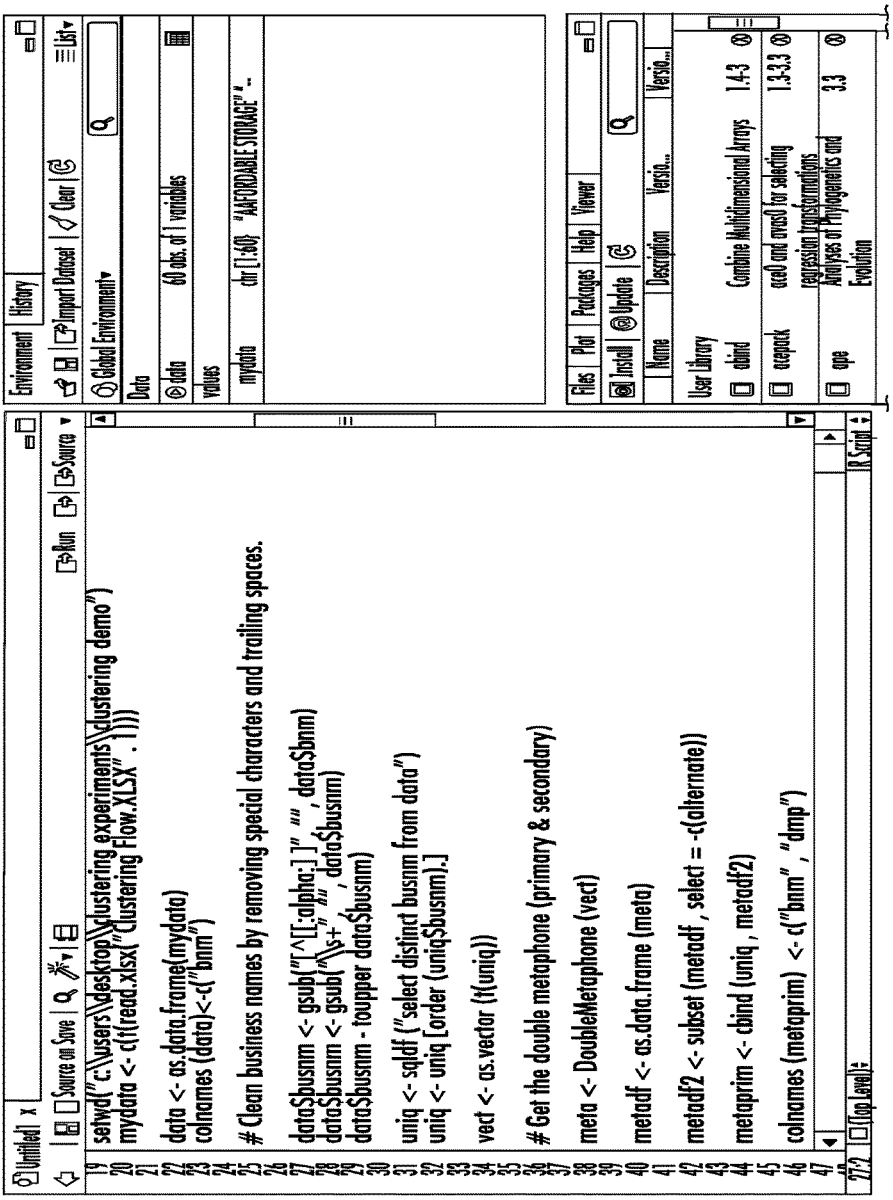
Figure 11B:
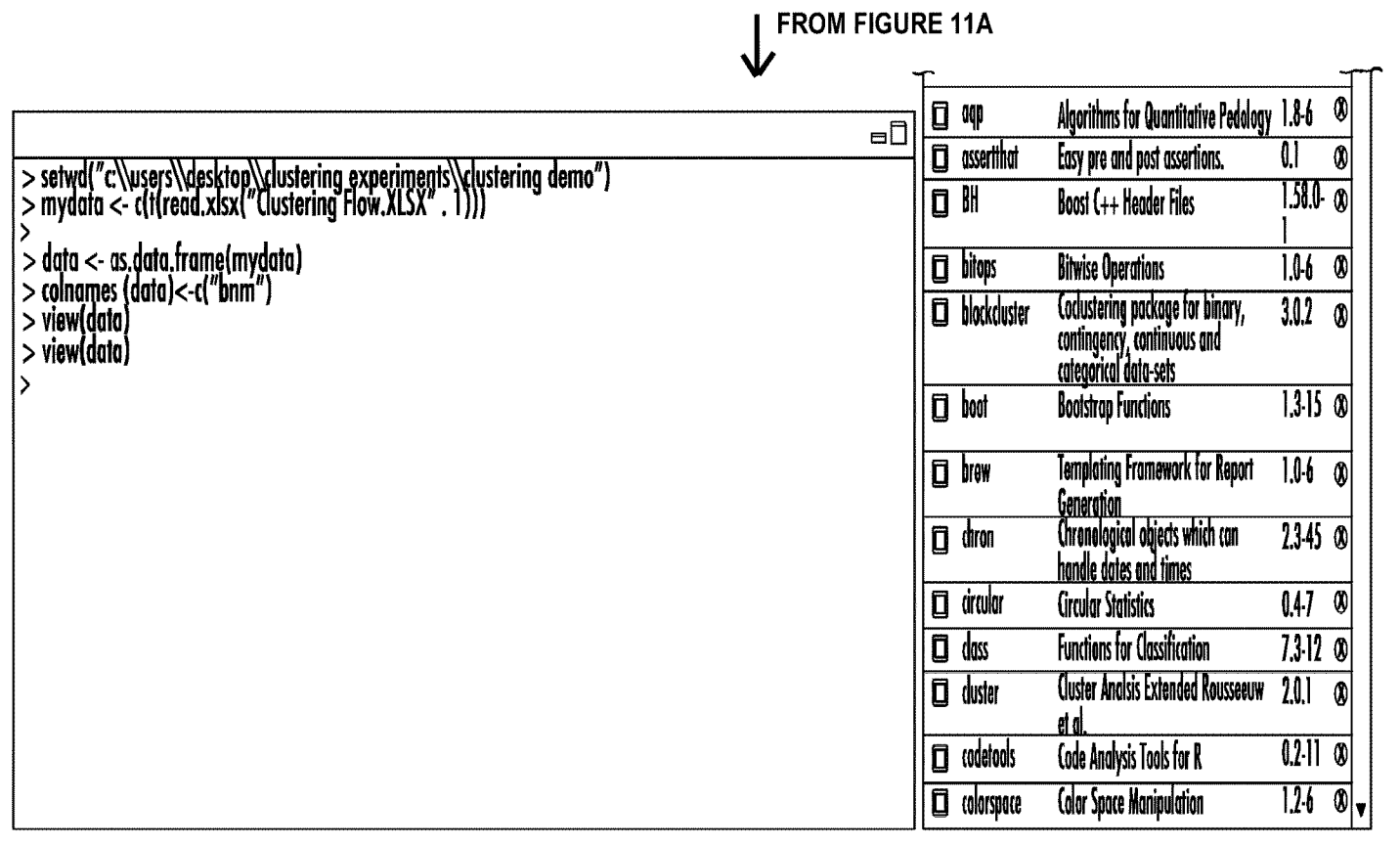

Referring now to FIGS. 11A-B, a screenshot 1100 illustrates an administrator portal configured to clean source data and perform a double metaphone algorithm on the data according to embodiments of the invention. FIG. 11B is a continuation of FIG. 11A showing the administrator portal console.

Figure 11C:
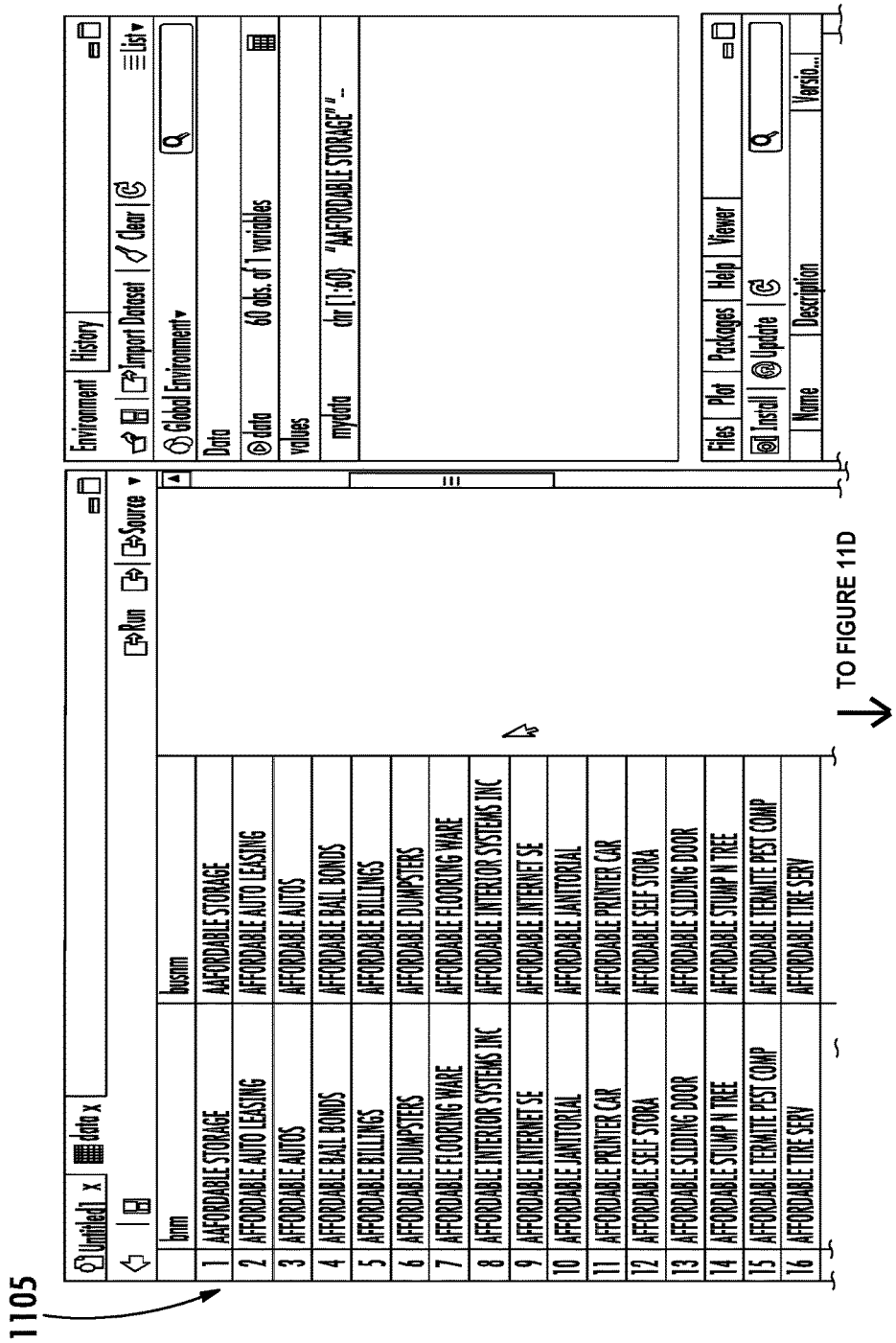

Referring now to FIGS. 11C-D, a screenshot 1105 illustrates an administrator portal showing a list of business names after cleaning has been applied according to embodiments of the invention. FIG. 11D is a continuation of FIG. 11C showing the administrator portal console.

Figure 11E:
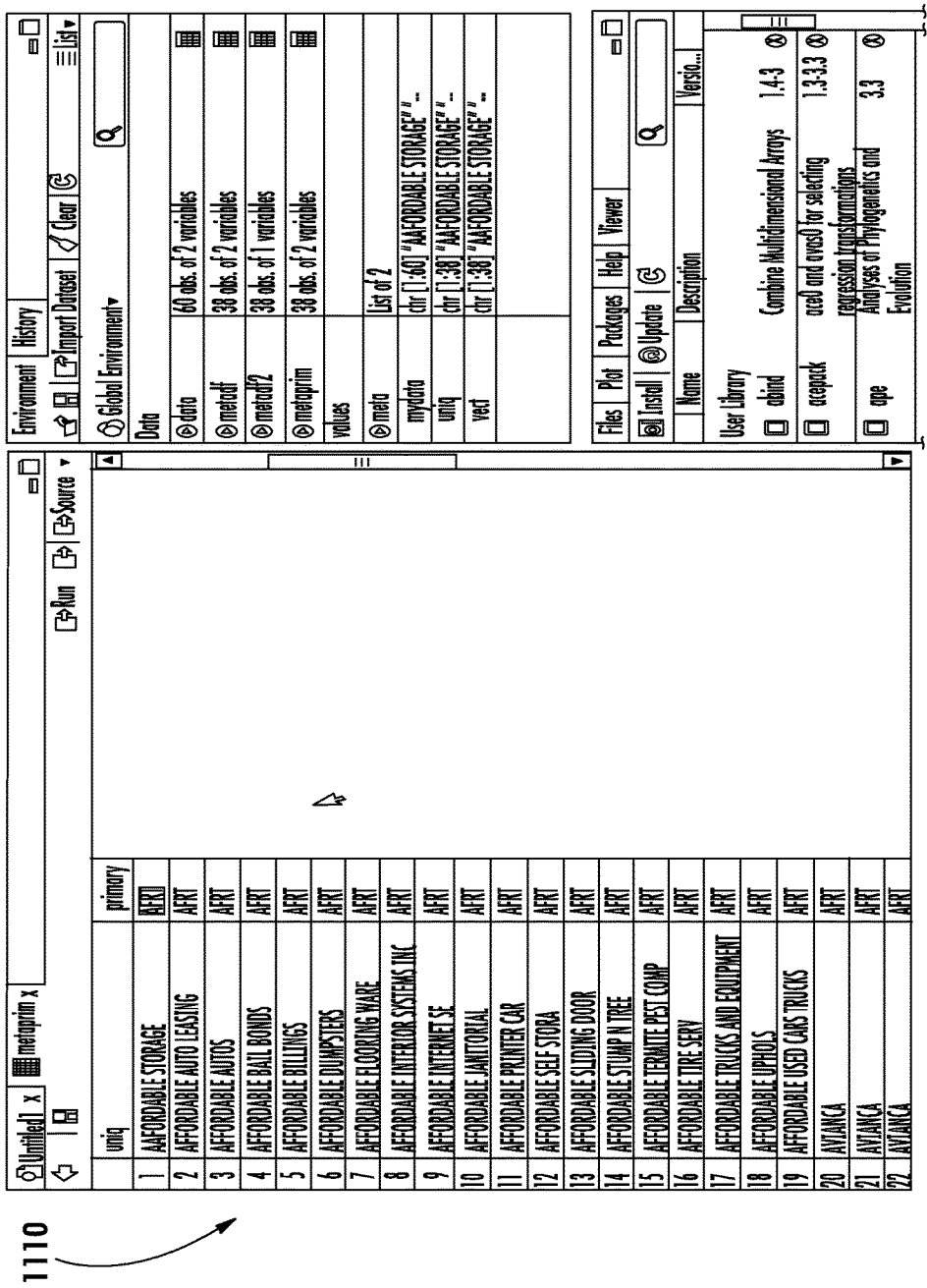

Referring now to FIGS. 11E-F, a screenshot 1110 illustrates an administrator portal showing the list of business names after the double metaphone has been applied according to embodiments of the invention. FIG. 11F is a continuation of FIG. 11E showing the administrator portal console.

Figure 11G:
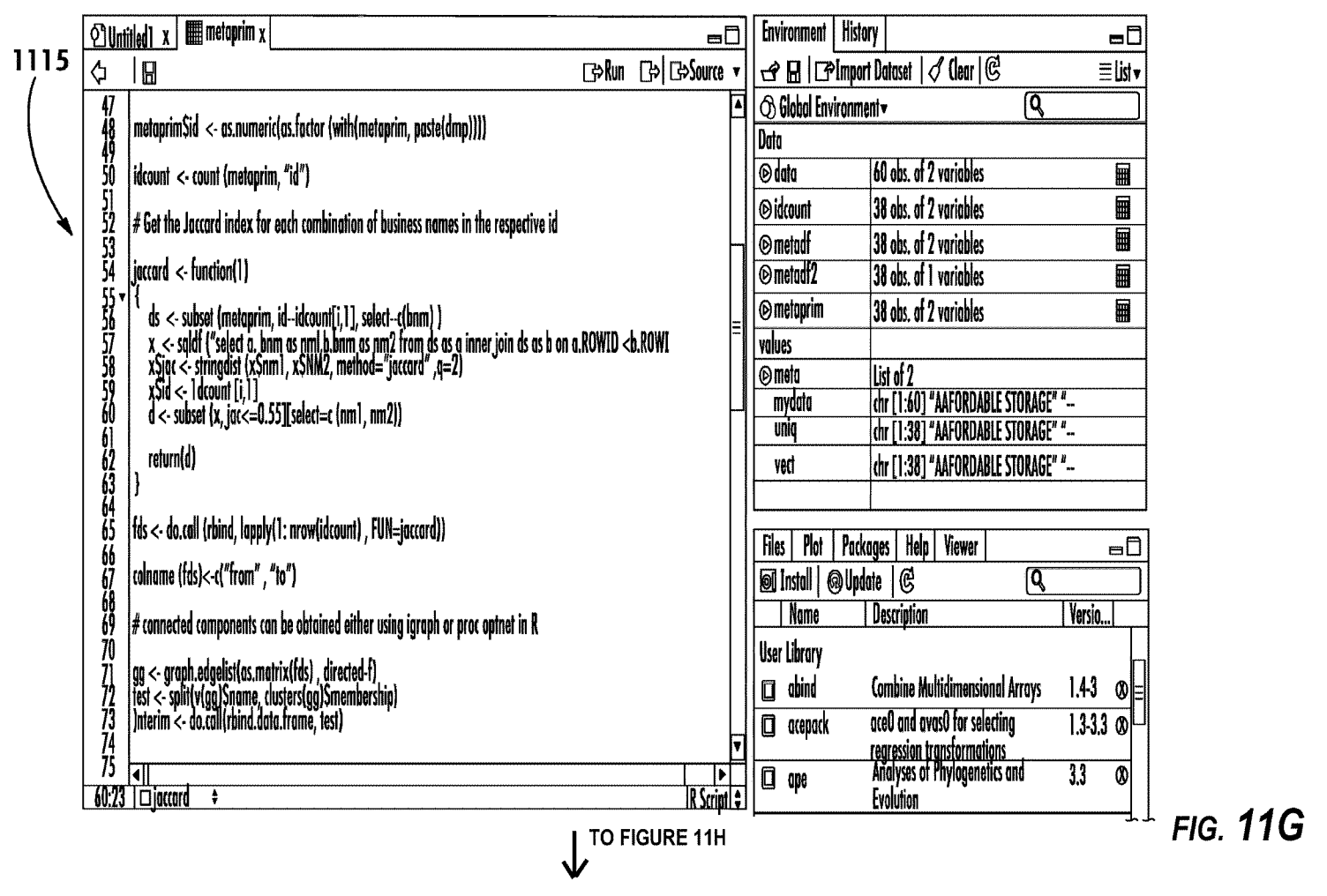

Referring now to FIGS. 11G-H, a screenshot 1115 illustrates an administrator portal configured to perform a Jaccard distance algorithm on the data according to embodiments of the invention. FIG. 11H is a continuation of FIG. 11G illustrating the administrator portal console.

Figure 11I:
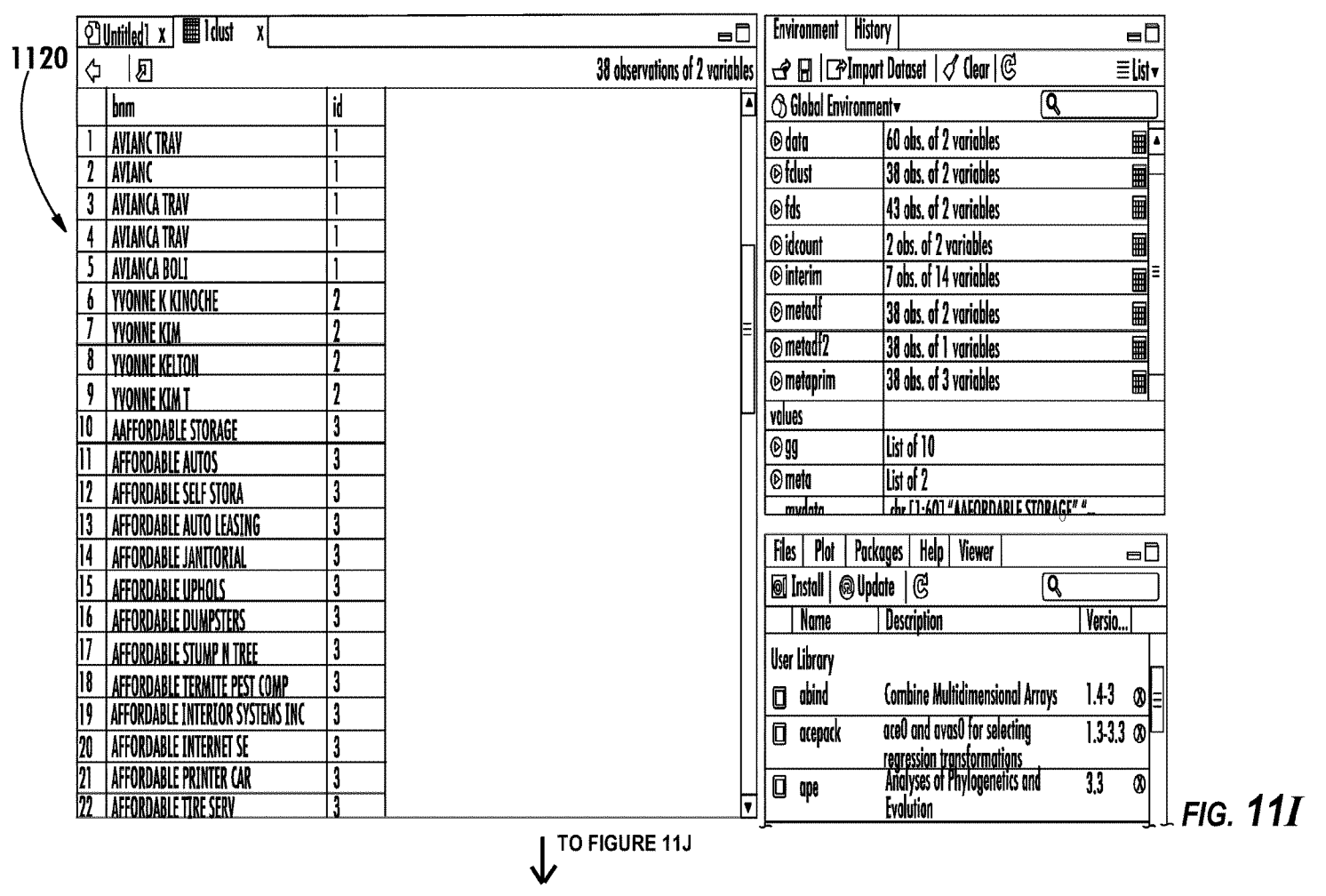
Figure 11J:
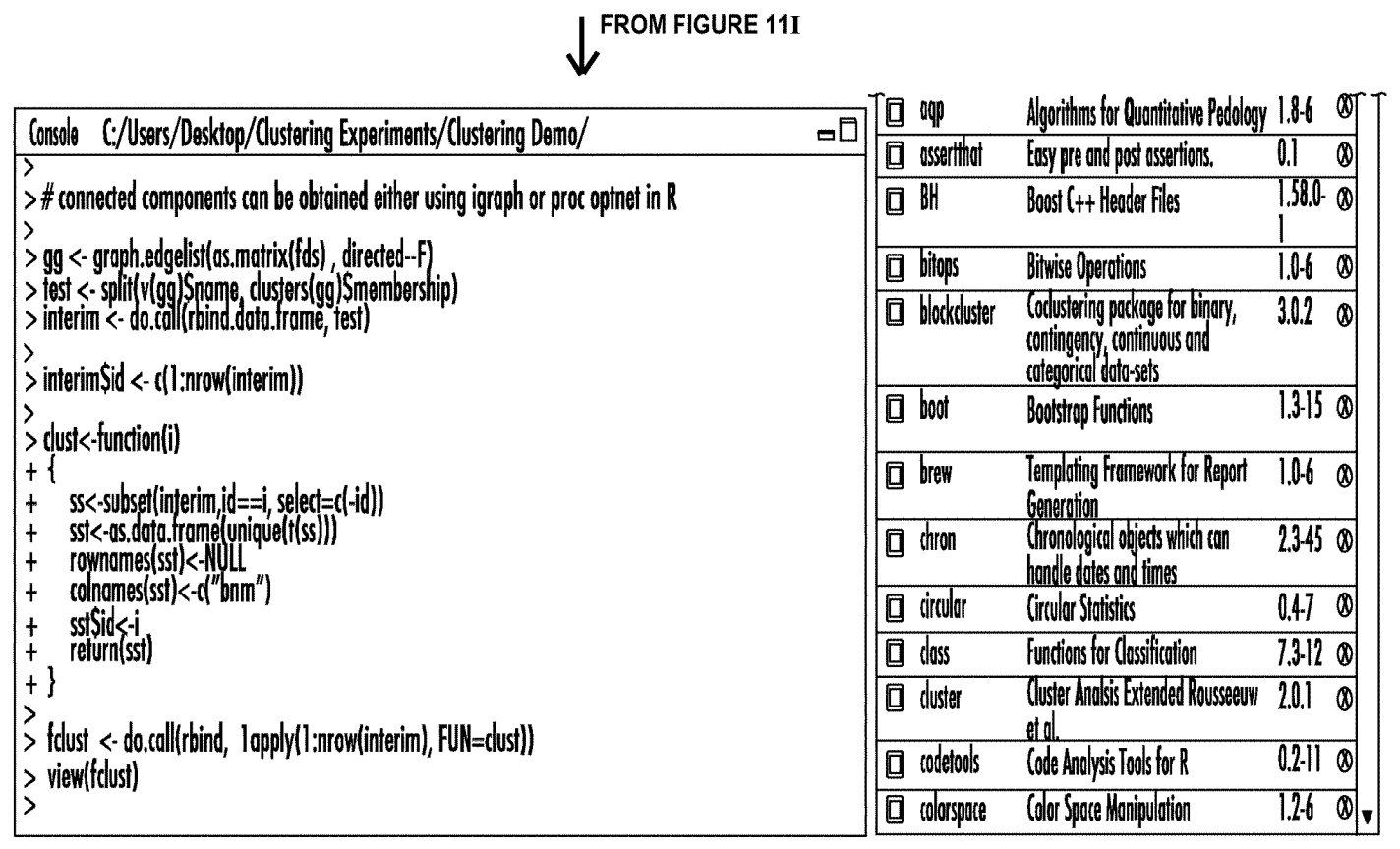

Referring now to FIGS. 11I-J, a screenshot 1120 illustrates an administrator portal showing the list of business names after the Jaccard distance algorithm has been applied to the data according to embodiments of the invention. FIG. 11J is a continuation of FIG. 11I showing the administrator portal console.

Figure 11K:
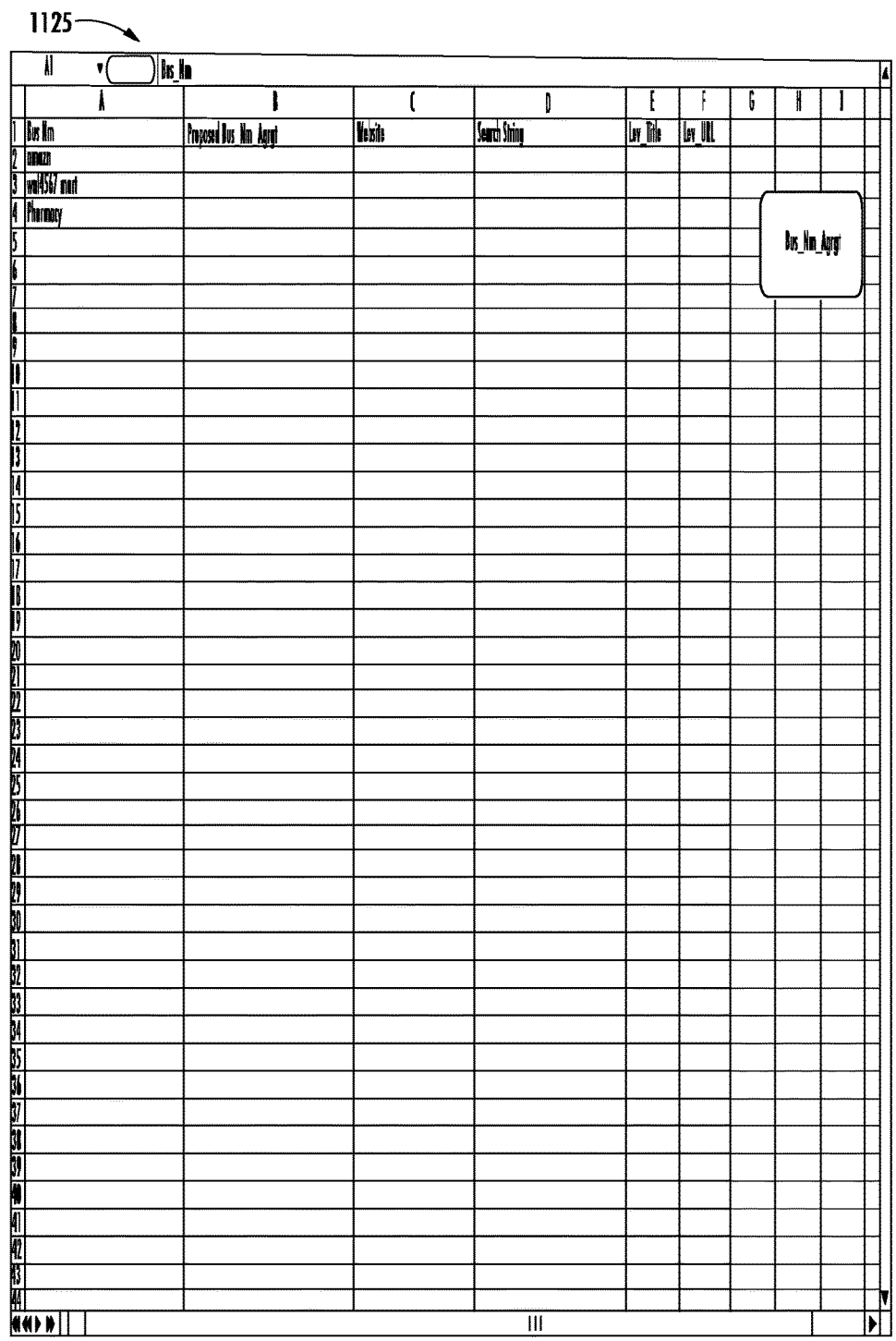

Referring now to FIG. 11K, a screenshot 1125 illustrates an administrator portal showing a spreadsheet used in assigning a business name aggregate to a set of data according to embodiments of the invention.

Figure 11L:
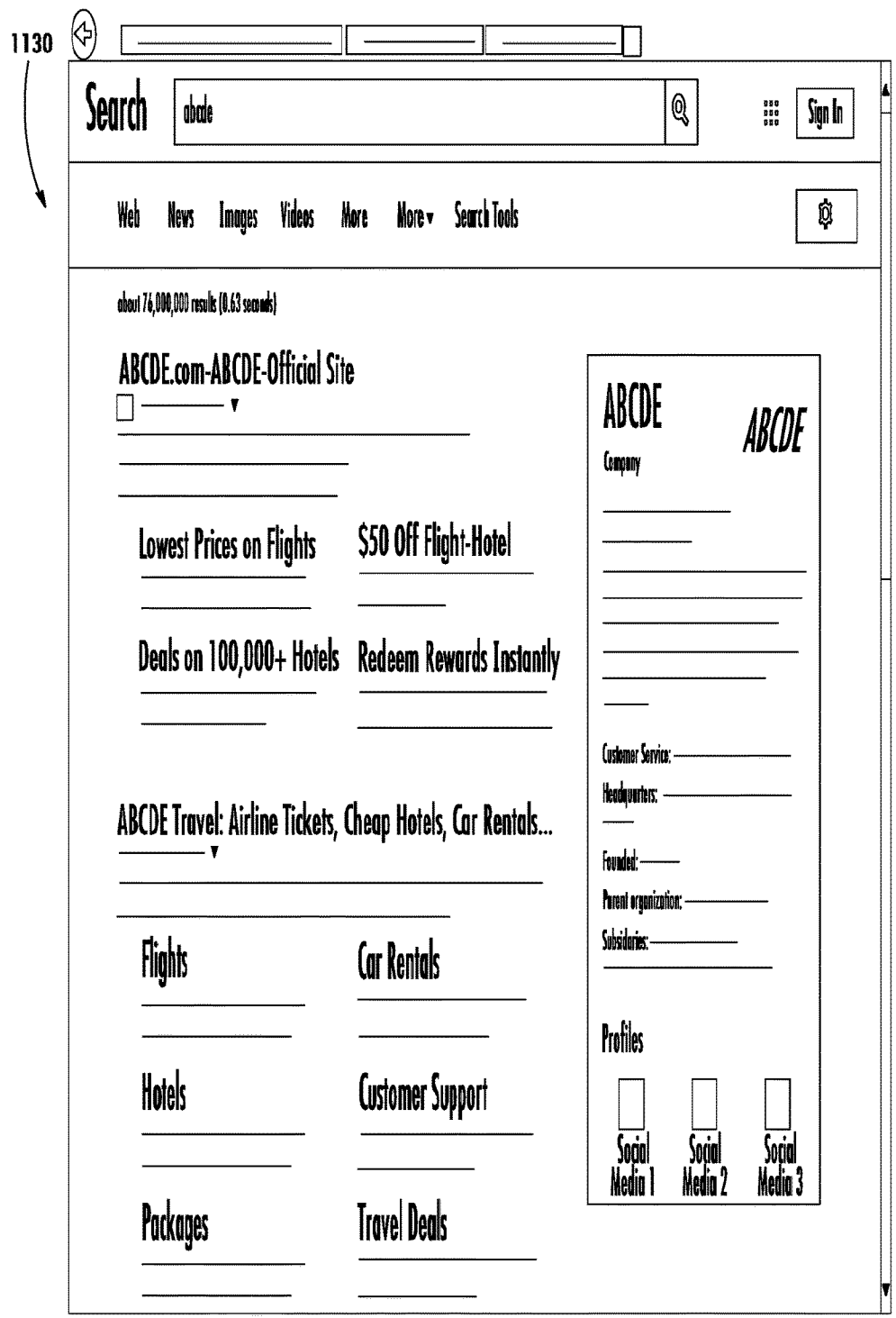

Referring now to FIG. 11L, a screenshot 1130 illustrates search results used in assigning a business name aggregate to a set of data according to embodiments of the invention.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for transforming historical data collected in response to one or more triggering events, in order to classify textual values, the system comprising:
   a computer apparatus including a processor and a memory; and
   a software module stored in the memory, comprising executable instructions that when executed by the processor cause the processor to:
      access a plurality of textual values from historical transaction data;
      remove undesired characters from the plurality of textual values;
      implement a clustering algorithm to the plurality of textual values to identify one or more distinct patterns within the plurality of textual values, wherein the clustering algorithm comprises:
         a primary process for coding the plurality of textual values into one or more phonetic components, thereby reducing the plurality of textual values into a combination of consonant sounds, wherein identifying the one or more distinct patterns within the plurality of textual values comprises comparing pronunciations and phonetics of the plurality of textual values; and
         a secondary process for identifying and classifying, based on an Internet search, one or more of the plurality of textual values unable to be classified by the primary process;
      create one or more clusters by grouping the plurality of textual values based, respectively, on the one or more distinct patterns output by the primary process and the Internet search of the secondary process;
      apply a similarity gauge to the textual values of each of the clusters to determine similarity or dissimilarity among the textual values of each cluster;
      filter the textual values of each cluster to determine which textual values belong in each cluster and which textual values do not belong in each cluster, wherein the textual values that belong are cluster values;
      pass the cluster values for each cluster to a reference table;
      store the cluster values for each cluster in the reference table for future access; and
      in response to a need for classification of a future set of textual values, access the reference table and lookup the future set of textual values in the reference table to determine whether any of the future set of textual values are cluster values.

2. The system of claim 1, wherein comparing pronunciations and/or phonetics of the textual values comprises:
   applying a double metaphone algorithm to the textual values.

3. The system of claim 1, wherein applying a similarity gauge to the textual values comprises:
   determining a Jaccard distance score among the textual values of each cluster.

4. The system of claim 1, wherein the instructions when executed further cause the processor to:
   connect the textual values that belong in each cluster; and
   remove the textual values that do not belong in each cluster.

5. The system of claim 4, wherein connecting the textual values that belong in each cluster comprises:
   applying an OPTNET algorithm to the textual values of each cluster.

6. The system of claim 1, wherein filtering the textual values of each cluster comprises:
   determining a Jaccard distance score threshold;
   comparing the Jaccard distance score to the Jaccard distance score threshold for each of the textual values of each cluster, thereby filtering textual values based on their similarity and/or dissimilarity.

7. The system of claim 1, wherein the instructions when executed further cause the processor to:
   apply a standardized value aggregate to the cluster values of each cluster.

8. A computer program product for transforming historical data collected in response to one or more triggering events, in order to classify textual values, the computer program product comprising:
- a non-transitory computer readable storage medium having computer readable program code embodied therewith, the computer readable program code comprising:
- computer readable program code configured to access a plurality of textual values from historical transaction data;
- computer readable program code configured to remove undesired characters from the plurality of textual values;
- computer readable program code configured to implement a clustering algorithm to the plurality of textual values to identify one or more distinct patterns within the plurality of textual values, wherein the clustering algorithm comprises:
  - a primary process coding the plurality of textual values into one or more phonetic components, thereby reducing the plurality of textual values into a combination of consonant sounds, wherein identifying the one or more distinct patterns within the plurality of textual values comprises comparing pronunciations and phonetics of the plurality of textual values; and
  - a secondary process for identifying and classifying, based on an Internet search, one or more of the plurality of textual values unable to be classified by the primary process;
- computer readable program code configured to create one or more clusters by grouping the plurality of textual values based, respectively, on the one or more distinct patterns output by the primary process and the Internet search of the secondary process;
- computer readable program code configured to apply a similarity gauge to the textual values of each of the clusters to determine similarity or dissimilarity among the textual values of each cluster;
- computer readable program code configured to filter the textual values of each cluster to determine which textual values belong in each cluster and which textual values do not belong in each cluster, wherein the textual values that belong are cluster values;
- computer readable program code configured to pass the cluster values for each cluster to a reference table;
- computer readable program code configured to store the cluster values for each cluster in the reference table for future access; and
- computer readable program code configured to, in response to a need for classification of a future set of textual values, access the reference table and lookup the future set of textual values in the reference table to determine whether any of the future set of textual values are cluster values.

9. The computer program product of claim 8, wherein comparing pronunciations and/or phonetics of the textual values comprises:
- applying a double metaphone algorithm to the textual values.

10. The computer program product of claim 8, wherein applying a similarity gauge to the textual values comprises:
- determining a Jaccard distance score among the textual values of each cluster.

11. The computer program product of claim 8, the computer readable program code comprising:
- computer readable program code configured to connect the textual values that belong in each cluster; and
- computer readable program code configured to remove the textual values that do not belong in each cluster.

12. The computer program product of claim 11, the computer readable program code comprising:
- computer readable program code configured to apply an OPTNET algorithm to the textual values of each cluster.

13. The computer program product of claim 8, the computer readable program code comprising:
- computer readable program code configured to determine a Jaccard distance score threshold; and
- computer readable program code configured to compare the Jaccard distance score to the Jaccard distance score threshold for each of the textual values of each cluster, thereby filtering textual values based on their similarity and/or dissimilarity.

14. The computer program product of claim 8, the computer readable program code comprising:
- computer readable program code configured to apply a standardized value aggregate to the cluster values of each cluster.

15. A method for transforming historical data collected in response to one or more triggering events, in order to classify textual values, the method comprising:
- accessing a plurality of textual values from historical transaction data;
- removing undesired characters from the plurality of textual values;
- implementing a clustering algorithm to the plurality of textual values to identify one or more distinct patterns within the plurality of textual values, wherein the clustering algorithm comprises:
  - a primary process for coding the plurality of textual values into one or more phonetic components, thereby reducing the plurality of textual values into a combination of consonant sounds, wherein identifying the one or more distinct patterns within the plurality of textual values comprises comparing pronunciations and phonetics of the plurality of textual values; and
  - a secondary process for identifying and classifying, based on an Internet search, one or more of the plurality of textual values unable to be classified by the primary process;
- creating one or more clusters by grouping the plurality of textual values based, respectively, on the one or more distinct patterns output by the primary process and the Internet search of the secondary process;
- applying a similarity gauge to the textual values of each of the clusters to determine similarity or dissimilarity among the textual values of each cluster;
- filtering the textual values of each cluster to determine which textual values belong in each cluster and which textual values do not belong in each cluster, wherein the textual values that belong are cluster values;
- passing the cluster values for each cluster to a reference table;
- storing the cluster values for each cluster in the reference table for future access; and
- in response to a need for classification of a future set of textual values, accessing the reference table and lookup the future set of textual values in the reference table to determine whether any of the future set of textual values are cluster values.

\* \* \* \* \*